(12) United States Patent
Ri et al.

(10) Patent No.: US 6,486,293 B1
(45) Date of Patent: Nov. 26, 2002

(54) ELECTROPHOTOGRAPHIC PHOTOCONDUCTOR AND METHOD OF PRODUCING AROMATIC POLYCARBONATE RESIN FOR USE IN THE PHOTOCONDUCTOR

(75) Inventors: Kohkoku Ri, Shizuoka (JP); Masaomi Sasaki, Shizuoka (JP); Kazukiyo Nagai, Shizuoka (JP); Shinichi Kawamura, Shizuoka (JP); Susumu Suzuka, Kanagawa (JP); Katsuhiro Morooka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/691,265

(22) Filed: Oct. 19, 2000

Related U.S. Application Data

(62) Division of application No. 09/348,291, filed on Jul. 7, 1999, now Pat. No. 6,187,492.

(30) Foreign Application Priority Data

Jul. 7, 1998 (JP) ............................................. 10-191605
Apr. 8, 1999 (JP) ........................................... 11-101356
May 25, 1999 (JP) ........................................... 11-144557

(51) Int. Cl.[7] .............................................. C08G 64/00
(52) U.S. Cl. ....................................... 528/196; 528/198
(58) Field of Search ................................. 528/196, 198

(56) References Cited

U.S. PATENT DOCUMENTS 6,187,492 B1 * 2/2001 Ri et al. ........................ 430/73

* cited by examiner

*Primary Examiner*—Terressa M. Boykin
(74) *Attorney, Agent, or Firm*—Oblon, Spivak, McClelland, Maier & Neustadt, P.C.

(57) ABSTRACT

A method of producing an aromatic polycarbonate resin includes the step of carrying out solution polymerization of a diphenol compound having a triarylamine structure with a diol compound of formula (I):

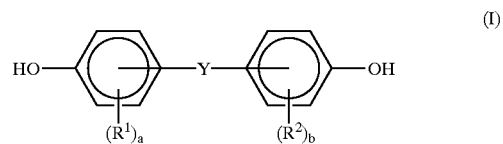

wherein $R^1$ and $R^2$ are each independently a substituted or unsubstituted alkyl croup, a substituted or unsubstituted aryl group, or a halogen atom; a and b are each independently an integer of 0 to 4: and Y is —COO— or

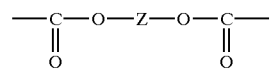

in which Z is a substituted or unsubstituted bivalent aliphatic group or a substituted or unsubstituted arylene group. In addition, an electrophotographic photoconductor has an electroconductive support, and a photoconductive layer formed thereon containing as an effective component the above-mentioned aromatic polycarbonate resin prepared by the solution polymerization.

18 Claims, 8 Drawing Sheets

ELECTROPHOTOGRAPHIC PHOTOCONDUCTOR AND METHOD OF PRODUCING AROMATIC POLYCARBONATE RESIN FOR USE IN THE PHOTOCONDUCTOR

This application is a Division of application Ser. No. 09/348,291 filed on Jul. 7, 1999, now U.S. Pat. No. 6,187,492.

BACKGROUND OF THE INVENTION

1. Field of the Invention

The present invention relates to an electrophotographic photoconductor comprising an electroconductive support and a photoconductive layer formed thereon, comprising an aromatic polycarbonate resin having charge transporting properties. In addition, the present invention also relates to a method of producing the above-mentioned aromatic polycarbonate resin with charge transporting properties.

2. Discussion of Background

Recently organic photoconductors are used in many copying machines and printers. These organic photoconductors have a layered structure comprising a charge generation layer (CGL) and a charge transport layer (CTL) which are successively overlaid on an electroconductive support. The charge transport layer (CTL) comprises a binder resin and a low-molecular-weight charge transport material (CTM) dissolved therein. The addition of such a low-molecular-weight gorge transport material (CTM) to the binder resin lowers the intrinsic mechanical strength of the binder resin, so that the CTL film becomes fragile. Such lowering of the mechanical strength of the CTL causes the wearing of the photoconductor or forms scratches and cracks in the surface of the photoconductor.

Although some vinyl polymers such as polyvinyl anthracene, polyvinyl pyrene and poly-N-vinylcarbazole have been studied as high-molecular-weight photoconductive materials for forming a charge transport complex for use in the conventional organic photoconductor, such polymers are not satisfactory from the viewpoint of photosensitivity.

In addition, high-molecular-weight materials having charge transporting properties have been also studied to eliminate the shortcomings of the above-mentioned layered photoconductor. For instance, there are proposed an acrylic resin raving a triphenylamine structure as reported by M. Stokla et al., in "J. Polym. Sci., vol 21, 969 (1983)"; a vinyl polymer having a hydrazone structure as described in "Japan Hard Copy '89 p. 67"; and polycarbonate resins having a triarylamine structure as disclosed in U.S. Pat. Nos. 9,801, 517, 4,806,443, 4,806,444, 4,937,165, 4,959,298, 5,030,532, 5,034,296, and 5,080,909, and Japanese Laid-Open Patent Applications Nos. 64-9964, 3-221522, 2-304456, 4-11627, 9-175337, 4-18371, 4-31404 and 4-133065. However, any materials have not yet been put to practical use.

According to the report of "Physical Review B46 6705 (1992)" by M. A. Abkowitz et al., it is confirmed that the drift mobility of a high-molecular weight charge transport material is lower than that of a low-molecular weight material by one figure. This report is based on the comparison between the photoconductor comprising a low-molecular weight tetraarylbenzidine derivative dispersed in the photoconductive layer and the one comprising a high-molecular polycarbonate having a tetraarylbenzidine structure in its molecule. The reason for this has not been clarified, but it is suggested that the photoconductor employing the high-molecular weight charge transport material produces poor results in terms of the photosensitivity and the residual potential although the mechanical strength of the photoconductor is improved.

Conventionally known representative aromatic polycarbonate resins are obtained by allowing 2,2-bis(4-hydroxyphenyl)propane (hereinafter referred to as bisphenol A) to react with a carbonate precursor material such as phosgene or diphenylcarbonate. Such polycarbonate resins made from bisphenol A are used in many fields because of their excellent characteristics, such as high transparency, high heat resistance, high dimensional accuracy, and high mechanical strength.

For example, this kind of polycarbonate resin is intensively studied as a binder resin for use in an organic photoconductor in the field of electrophotography. A variety of aromatic polycarbonate resins have been proposed as the binder resins for use in the charge transport layer of the layered photoconductor.

As previously mentioned, however, the mechanical strength of the aforementioned aromatic polycarbonate resin is decreased by the addition of the low-molecular-weight charge transport material in the charge transport layer of the layered electrophotographic photoconductor.

SUMMARY OR THE INVENTION

It is therefore a first object of the present invention to provide an electrophotographic photoconductor free from the conventional shortcomings, which can show high sensitivity and high durability.

The above-mentioned first object of the present invention cap be achieved by an electrophotographic photoconductor comprising an electroconductive support, and a photoconductive layer formed thereon, comprising as an effective component an aromatic polycarbonate resin which is prepared by solution polymerization of a diphenol compound having a triarylamine structure with a dial compound of formula (I)

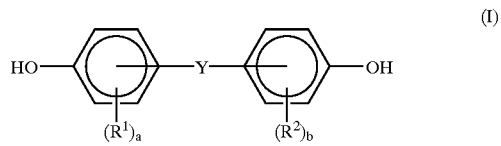

wherein $R^1$ and $R^2$ are each independently an alkyl group which may have a substituent, an aryl group which may have a substituent, or a halogen atom: a and b are each independently an integer of 0 to 4: and Y is —COO— or

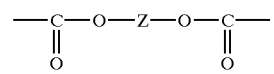

in which Z is a bivalent aliphatic group which may have a substituent or an, arylene group which may have a substituent.

A second object of the present invention is to provide a method or producing an aromatic polycarbonate resin that is remarkably useful as a high-molecular-weight charge transport material for use in an organic electrophotographic photoconductor.

The interfacial polymerization is widely used in the industrial production of aromatic polycarbonate resins. However, the interfacial polymerization has the drawbacks that impurities, that is, various electrolytes such as a salt and an alkali must be completely removed from the obtained polymer solution. Therefore, the industrial production by the interfacial polymerization needs many complicated techniques. In particular, some industrial skills of a high order are required to obtain the aromatic polycarbonate resin as a high-molecular-weight charge transport material with high purity.

The method of producing the aromatic polycarbonate by solution polymerization using a chloroformate is proposed in Japanese Laid-Open Patent Applications 8-269183, 9-151248 and 9-22135. However, the synthesis of chloroformate restricts the diversity of reaction, and in addition, it is difficult to obtain, a polymer with a high molecular weight by the above-mentioned solution polymerization method.

Furthermore, a diphenol compound having an ester linkage cannot be turned into a desired polymer by the interfacial polymerizaton because the diphenol compound undergoes the hydrolysis in the course of interfacial polymerization.

A third object is therefore to provide a method of producing an aromatic polycarbonate resin with a high molecular weight with no difficulty.

A fourth object of the present invention is to provide a method of producing an aromatic polycarbonate resin with charge transporting properties by carrying out the solution polymerization in a uniform liquid phase around at room temperature using a simple apparatus.

The second to fourth objects of the present invention can be achieved by a method of producing an aromatic polycarbonate resin, comprising the step of carrying out solution polymerization of a diphenol compound having a triarylamine structure with a diol compound of formula (I):

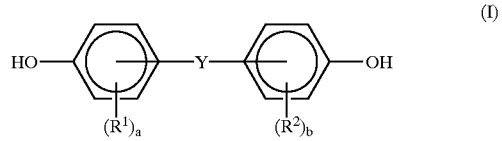

(I)

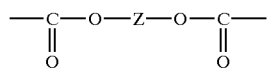

wherein $R^1$ and $R^2$ are each independently an alkyl group which may have a substituent, an aryl group which may have a substituent or a halogen atom; a and b are each independently an integer of 0 to 4; and Y is —COO— or $$-\overset{\text{O}}{\underset{\|}{\text{C}}}-\text{O}-\text{Z}-\text{O}-\overset{\text{O}}{\underset{\|}{\text{C}}}-$$

in which Z is a bivalent aliphatic group which may have a substituent or an arylene group which may have a substituent.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
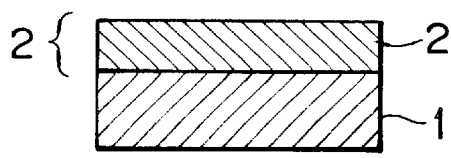
FIG. 1 is a schematic cross-sectional view of a first example of an electrophotographic photoconductor according to the present invention.

The method of producing an aromatic polycarbonate resin comprising a specific structural unit by the solution polymerization can solve the conventional problems caused by the interfacial polymerization. According to the present invention, there is provided a method of producing an aromatic polycarbonate resin, comprising the step of carrying out solution polymerization of a diphenol compound having a triarylamine structure with a diol compound of formula (I):

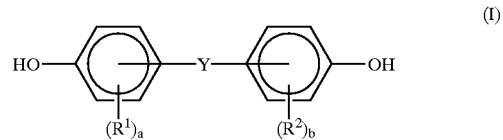

(I)

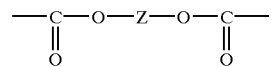

wherein $R^1$ and $R^2$ are each independently an alkyl group which may have a substituent, an aryl group which may have a substituent, or a halogen atom; a and b are each independently an integer of 0 to 4; and Y is —COO— or $$-\overset{\text{O}}{\underset{\|}{\text{C}}}-\text{O}-\text{Z}-\text{O}-\overset{\text{O}}{\underset{\|}{\text{C}}}-$$

in which Z is a bivalent aliphatic group which may have a substituent or an arylene group which may have a substituent.

It is preferable that the diphenol compound having a triarylamine structure be a diphenol compound represented by the following formula (II):

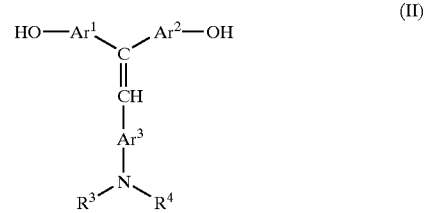

(II)

wherein $Ar^1$, $Ar^2$, and $Ar^2$, are each an arylene group which may have a substituent; $R^3$ and $R^4$, which may be the same or different, are each an aryl group, an alkyl group which may have a substituent, or an aryl group which may have a substituent.

It is also preferable that the diphenol compound having a triarylamine structure be a diphenol compound represented by the following formula (III):

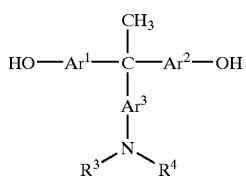

(III)

wherein Ar¹, Ar², Ar³, R³ and R⁴ are the same as those previously defined.

In particular, there can be provided a method of producing an aromatic polycarbonate resin of the following formula (IV) by subjecting the above mentioned diol compound of formula (I) and the above-mentioned diphenol compound of formula (II) to solution polymerization:

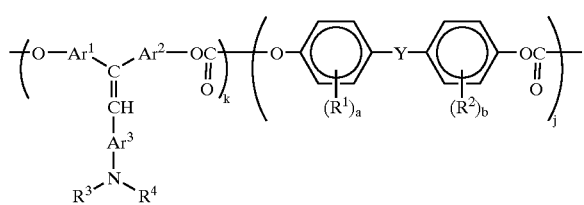

(IV)

wherein Ar¹, Ar², Ar³, R¹, R², R³, R⁴, Y, a and b are the same as those previously defined: and k is an integer of 5 to 5000 and j is an integer of 5 to 5000, provided that $0 < k/(k+j) \leq 1$.

In addition, there can be provided a method of producing or aromatic polycarbonate resin of the following formula (V) by subjecting the above-mentioned diol compound of formula (I) and the above-mentioned diphenol compound of formula (III) to solution polymerization:

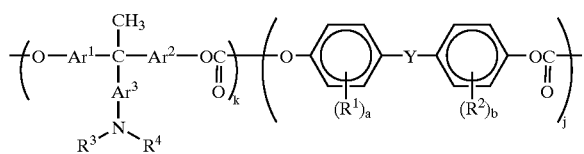

(V)

wherein Ar¹, Ar², Ar³, R¹, R²R³, R⁴, Y, a and b are the same as these previously defined; and k is an integer of 5 to 5000 and j is an integer of 5 to 5000, provided that $0 < k/(k+j) \leq 1$.

As previously mentioned, a copolymerized polycarbonate resin can be produced by the method of the present invention, which polycarbonate resin can be provided with charge transporting properties, owing to a copolymerizable diphenol compound of formula (II) or (III), and mechanical properties owing to a copolymerizable diol compound of formula (I). The aromatic polycarbonate resin thus produced has both the charge transporting properties and sufficient mechanical strength, so that when used in a photoconductive layer of the electrophotographic photoconductor, the photoconductive layer can exhibit excellent electrical characteristics, optical properties and mechanical properties.

The method of producing the polycarbonate resin of the present invention will now be explained in detail.

To be more specific, the aromatic polycarbonate resin comprising the specific structural unit can be produced by the solution polymerization in the following manner: A diol is dissolved in a solvent to prepare a solution, an agent for deacidifying is added to the solution, and a halogenated carbonyl compound such as phosgene is added to the above prepared mixture.

In addition to the phosgene, trichloromethyl chloroformate that is a dimer of phosgene, and bis(trichloromethyl) carbonate that is a trimer of phosgene are usable as the halogenated carbonyl compounds in the above-mentioned solution polymerization. Further, halogenated carbonyl compounds derived from other halogen atoms than chlorine, for example, carbonyl bromide, carbonyl iodide and carbonyl fluoride are also employed.

Those conventional synthesis methods are described in the reference, such as "Handbook of Polycarbonate Resin" (issued by The Nikkan Koqyo Shimbun Ltd.).

As the agent for deacidifying, tertiary amine such as trimethylamine, triethylamine or tripropylamine, and pyridine are usable.

Examples of the solvent used in the above-mentioned solution polymerization are halogenated hydrocarbon solvents such as dichloromethane, dichloroethane, trichloroethane, tetrachloroethane, trichloroethylene and chloroform; cyclic ether solvents such as tetrahydrofuran and dioxane; hydrocarbon solvents such as toluene and xylene; and pyridine.

When pyridine is used as an agent for deacidifying, a phosgene—pyridine adduct is generated. The reactivity of such an adduct and bisphenol is stronger than that of phosgene itself and bisphenol. If the phosgene—pyridine adduct is in excess with respect to the bisphenol, a chloroformate-pyridine adduct is generated at both ends of the obtained polymer. In such a case, the molecular weight of the obtained polymer can be exactly increased by adding the bisphenol in an amount equimolar to the amount of the chloroformate—pyridine adduct. To use the bisphenol, phosgene and pyridine in strictly stoichiometric amounts can produce a polycarbonate with high molecular weight. In practice, however, for obtaining high yield, it is preferable that the phosgene be used in a slight excess with respect to the stoichiometric amount thereof, and that pyridine be added in slight excess with respect to the phosgene in terms of stoichiometric amount.

The molecular weight of the synthesized polycarbonate is determined by various factors, mainly by the reaction temperature the amount of pyridine, the amount of phosgene, the rate of addition of phosgene, and the amount of a molecular weight modifier to be employed.

In the above-mentioned solution polymerization, it is preferable to employ dehydrated pyridine as an agent for deacidifying in an amount of 5 to 100 vol %, more preferably 30 to 50 vol %, of the total volume of a reaction solvent employed.

The solution polymerization is carried out in a completely dehydrated non-aqueous system so as not to decompose the above-mentioned phosgene—pyridine adduct or the chloroformate—pyridine adduct generated at ends of the molecule by water.

The aromatic polycarbonate resin having charge transporting properties, as represented by formula (IV) or (V) can be thus produced. The amount ratio of the. diphenol with the charge transporting properties of formula (II) or (III) to the diol of formula (I) may be determined in a wide range in light of the desired properties.

By choosing a proper polymerization process, the polycarbonate resin can be obtained in the form of a random copolymer, alternating copolymer, block copolymer, random alternating copolymer, or random block copolymer. The polycarbonate resin in the form of a random block copolymer can be prepared by adding several kinds of diphenols in the course of the reaction.

To control the molecular weight of the obtained polycarbonate resin, it is desirable to employ a terminator as the molecular weight modifier in the course of the above-mentioned solution polymerization reaction. Consequently, a substituent derived from the terminator may be bonded to the end of the molecule of the obtained polycarbonate resin.

As the terminator for use in the present invention, a monovalent aromatic hydroxy compound and haloformate derivatives thereof, and a monavalent carboxylic acid and halide derivatives thereof can be used alone or in combination.

Specific examples of the monavalent aromatic hydroxy compounds are phenols such as phenyl, p-cresol, o-ethylphenol, p-ethylphenol, p-isopropylphenol, p-tert-butylphenol, p-cumylphenol, p-cyclohexylphenol, p-octylphenol, p-nonylphenol, 2,4-xylenol, p-methoxyphenol, p-hexyloxyphenol, p-decyloxyphenol, o-chlorophenol, m-chlorophenol, p-chlorophenol, p-bromophenol, pentabromophenol, pentachlorophenol, p-phenylphenol, p-isopropenylphenol, 2,4-di(1'-methyl-1'-phenylethyl)phenol, β-naphthol, α-naphthol, p-(2', 4', 4'-trimethylchromanyl)phenol and 2-(4'-methoxyphenyl)-2-(4"-hydroxyphenyl)propane. In addition, alkali metal salts and alkaline earth metal salts of the above phenols can also be employed.

Various haloformate derivatives of the above-mentioned monovalent aromatic hydroxy compounds are also usable as the terminators.

Specific examples of the monovalent carboxylic acids are aliphatic acids such as acetic acid, propionic acid, butyric acid, valeric acid, caproic acid, heptanic acid, caprylic acid, 2,2-dimethylpropionic acid, 3-methylbutyric acid, 3,3-dimethylbutyric acid, 4-methylvaleric acid, 3,3-dimethylvaleric acid, 4-methylcaproic acid, 3,5-dimethylacaproic acid, and phenoxyacetic acid; and benzoic acids such as benzoic acid, p-methylbenzoic acid, p-tent-butylbenzoic acid, p-butoxybenzoic acid, p-octyloxybenzoic acid, p-phenylbenzoic acid, p-benzylbenzoic acid, and p-chlorobenzoic acid. In addition alkali metal salts and alkaline earth metal salts of the above-mentioned aliphatic acids and benzoic acids can also be employed.

Various halide derivatives of the above-mentioned monovalent carboxylic acids can also be employed as the terminators.

Of those terminators, the monovalent aromatic hydroxy compounds, in particular, phenol, p-tert-butylphenol, and p-cumylphenol are preferable.

It is preferable that the aromatic polycarbonate resin thus produced nave a number-average molecular weight of 1,000 to 500,000, more preferably in the range of 10,000 to 200,000 when expressed by the styrene-reduced value.

The reaction temperature of the solution polymerization is generally in the range of 0 to 40° C. The polymerization reaction can be terminated in several minutes to 5 hours.

Furthermore a branching agent may be added in a small amount during the solution polymerization in order to improve the mechanical properties of the obtained polycarbonate resin. Any compounds having three or more reactive groups, which may be the same or different, selected from the group consisting of an aromatic hydroxyl group, a haloformate group, a carboxylic acid group, a carboxylic acid halide group, and an active halogen atom can be used as the branching agents for use in the present invention.

Specific examples of the branching agent for use in the present invention are as follows:
phloroglucinol,
4,6-dimethyl-2,4,6-tris(4'-hydroxyphenyl)-2-heptene,
4,6-dimethyl-2,4,6-tris(4'-hydroxyphenyl)heptane,
1,3,5-tris(4'-hydroxyphenyl)benzene,
1,1,1-tris(4'-hydroxyphenyl)ethane,
1,1,2-tris(4'-hydroxyphenyl)propane,
α,α,α'-tris(4'-hydroxyphenyl)-1-ethyl-4-isopropylbenzene,
2,4-bis[α-methyl-α-(4'-hydroxyphenyl)ethyl]phenol,
2-(4'-hydroxyphenyl)-2-(2",4"-dihydroxyphenyl)propane,
tris(4-hydroxyphenyl)phosphine,
1,1,4,4-tetrakis(4'-hydroxyphenyl)cyclohexane,
2,2-bis[4',4'-bis(4"-hydroxyphenyl)cyclohexyl]propane,
α,α,α',α'-tetrakis(4'-hydroxyphenyl)-1,4-diethylbenzene,
2,2,5,5-tetrakis(4'-hydroxyphenyl)hexane,
1,1,2,3-tetrakis(4'-hydroxyphenyl)propane,
1,4-bis(4',4"-dihydroxytriphenylmethyl)benzene,
3,3',5,5'-tetrahydroxydiphenyl ether,
3,5-dihydroxybenzoic acid,
3,5-bis(chlorocarbonyloxy)benzoic acid,
4-hydroxyisophthalic acid,
4-chlorocarbonyloxyisophthalic acid,
5-hydroxyphthalic acid,
5-chlorocarbonyloxyphthalic acid,
trimesic trichloride, and
cyanuric chloride.

Those branching agents may be used alone or in combination.

The polycarbonate resin thus synthesized is purified through the steps of removing the pyridine therefrom, washing with water, and reprecipitating.

To the aromatic polycarbonate resin produced by the previously mentioned method of the present invention, various additives such as an antioxidant, a light stabilizer, a thermal stabilizer, a lubricant and a plasticizer can be added when necessary.

The diphenol compounds of formulas (II) and (III) and the aromatic polycarbonate of formulas (IV) and (V) will now be explained in detail.

In the formulas (II), (III), (IV) and (V), $R^3$ and $R^4$, which may be the same or different, are each an acyl group, an alkyl group which may have a substituent, or an aryl group which may have a substituent.

The alkyl group represented by $R^3$ and $R^4$ is a straight-chain or branched alkyl group having 1 to 5 carbon atoms. The above alkyl group may have a substituent such as fluorine atom, cyano group, or a phenyl group which may have a substituent selected from the group consisting of a halogen atom and a straight-chain or branched alkyl group having 1 to 5 carbon atoms.

Specific examples of the above alkyl group represented by $R^3$ and $R^4$ include methyl group, ethyl group, n-propyl group, i-propyl group, tert-butyl group, sec-butyl group, n-butyl group, i-butyl group, trifluoromethyl group, 2-cyanoethyl group, benzyl group, 4-chlorobenzyl group, and 4-methylbenzyl group.

Examples of the aryl group represented by $R^3$ and $R^4$ are phenyl group, naphthyl group, biphenylyl group, terphenylyl group, pyrenyl group, fluorenyl group, 9,9-dimethyl-2-fluorenyl group, azulenyl group, anthryl group, triphenylenyl group, chrysenyl group, fluorenylidenephenyl group, 5H-dibenzo[a,d]cyclo-heptenylidenephenyl group, thienyl group, benzothienyl group, furyl group, benzofuranyl group, carbazolyl group, pyridinyl group, pyrrolidyl group, and oxazolyl group.

The above-mentioned aryl group may have a substituent such as the above-mentioned substituted or unsubstituted alkyl group, an alkoxyl group having such an alkyl group, a halogen atom such as fluorine atom, chlorine atom, bromine atom or iodine atom, or an amino group represented by the following formula:

in which $R^5$ and $R^6$ are each the same substituted or unsubstituted alkyl group or the same substituted or unsubstituted aryl group as those defined in $R^3$ and $R^4$, and $R^5$ and $R^6$ may form a ring together or in combination with a carbon atom of the aryl group to constitute piperidino group, morpholino group or julolidyl group.

In the formulas (II), (III), (IV) and (V), $Ar^1$, $Ar^2$ and $Ar^3$ are each a substituted or unsubstituted arylene group.

In this case, there can be employed any bivalent groups derived from the substituted or unsubstituted aryl group previously defined in the description of $R^3$ and $R^4$.

In producing the aromatic polycarbonate resin, a diphenol compound having a triphenylamine structure, for example, the above-mentioned diphenol compound of formula (II) or (III) is employed. In addition to the diphenol compound of formula (II) or (III), any conventional diphenol compounds that have charge transporting properties can be employed in order to improve the electrical and mechanical properties of the obtained polycarbonate resin.

For instance, there can be employed as the diphenol compounds distyrylbenzene derivatives (Japanese Laid-Open Patent Application 9-71642), diphenylbenzene derivatives (Japanese Laid-Open Patent Application 9-104746), α-phenylstilbene derivatives, butadiene derivatives (Japanese Laid-Open Patent Application 9-235367), hydrogenated butadiene derivatives (Japanese Laid-Open Patent Application 9-87376), diphenylcylohexane derivatives (Japanese Laid-Open Patent Application 9-110976), distyryltriphenylamine derivatives (Japanese Laid-Open Patent Application 9-268226), distyryldiamine derivatives, diphenyldistyrylbenzene derivatives (Japanese Laid-Open Patent Applications 9-221544 and 9-227669), stilbene derivatives (Japanese Laid-Open Patent Applications 9-157378 and 9-162642), m-phenylenediamine derivatives (Japanese Laid-Open Patent Applications 9-302084 and 9-302085), and resorcin derivatives (Japanese Laid-Open Patent Application 9-328539).

The diphenol compounds of formulas (II) and (III) for use in the present invention can be synthesized in accordance with the method as described by the inventors of the present invention in (Japanese Laid-Open Patent Applications 7-258399, 8-269183, 9-151248, 9-241369 and 9-272735.

The diol compound of formula (I) for the preparation of the aromatic polycarbonate resin will now be explained.

In formula (I), $R^1$ and $R^2$ are each independently an alkyl group which may have a substituent, an aryl group which may have a substituent, or a halogen atom; a and b are each independently an integer of 0 to 4; and Y is —COO— or

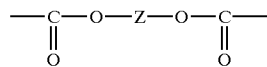

in which Z is a bivalent aliphatic group which may have a substituent or an arylene group which may have a substituent.

For $R^1$ and $R^2$, the same substituted or unsubstituted alkyl group and the same substituted or unsubstituted aryl group as those defined in the description of $R^3$ and $R^4$ can be employed. As the halogen atom represented by $R^1$ and $R^2$, there can be employed fluorine atom, chlorine atom, bromine atom and iodine atom.

When Z is a substituted or unsubstituted arylene group, there can be employed any bivalent groups derived from the substituted or unsubstituted aryl group previously defined in the description of $R^3$ and $R^4$.

Specific examples of the diol compounds represented by formula (I) include 4-hydroxyphenyl-4-hydroxybenzoate, ethylene glycol-bis(4-hydroxybenzoate, diethylene glycol-bis(4-hydroxybenzoate), triethylene glycol-bis(4-hydroxybenzoate), 1,3-bis (4-hydroxyphenyl)tetramethyl-disiloxane, and phenol-modified silicone oil.

Further, an aromatic diol compound having an ester linkage produced by the reaction between 2 moles of a diol and one mole of isophthaloyl chloride or terephthaloyl chloride is also usable.

Furthermore, the following diols known as the structural units of the conventional polycarbonate resins can be employed: ethylene glycol, diethylene glycol, triethylene glycol, polyethylene glycol, polytetramethylene ether glycol, 1,3-propanediol, 1,4-butanediol, 1,5-pentanediol, 3-methyl-1,5-pentanediol, 1,6-hexanediol, 1,5-hexanediol, 1,7-heptanediol, 1,8-octanediol, 1,9-nonanediol, 1,10-decanediol, 1,11-undecanediol, 1,12-dodecanediol, neopentyl glycol, 2-ethyl-1,6-hexanediol, 2-methyl-1,3-propanediol, 2-ethyl-1,3-propanediol, 2,2-dimethyl-1,3-propanediol, 1,3-cyclohexanediol, 1,4-cyclohexanediol, cyclohexane-1,4-dimethanol, 2,2-bis(4-hydroxycyclohexyl)propane, xylylenediol, 1,4-bis(2-hydroxyethyl)benzene, 1,4-bis(3-hydroxypropyl)benzene, 1,4-bis(4-hydroxybutyl)benzene, 1,4-bis(5-hydroxypentyl)benzene, 1,4-bis(6-hydroxyhexyl)benzene, bis(4-hydroxyphenyl)methane, bis(2-methyl-4-hydroxyphenyl)methane, bis(3-methyl-4-hydroxyphenyl)methane, 1,1-bis(4-hydroxyphenyl)ethane, 1,2-bis(4-hydroxyphenyl)ethane, bis(4-hydroxyphenyl)phenylmethane, bis(4-hydroxyphenyl)diphenylmethane, 1,1-bis(4-hydroxyphenyl)-1-phenylethane, 1,3-bis(4-hydroxyphenyl)-1,1-demethylpropane, 2,2-bis(4-hydroxyphenyl)propane, 2-(4-hydroxyphenyl)-2-(3-hydroxyphenyl)propane, 1,1-bis(4-hydroxyphenyl)-2-methylpropane, 2,2-bis(4-hydroxyphenyl)butane, 1,1-bis(4-hydroxyphenyl)-3-methylbutane, 2,2-bis(4-hydroxyphenyl)pentane, 2,2-bis(4-hydroxyphenyl)-4-methylpentane, 2,2-bis(4-hydroxyphenyl)hexane, 4,4-bis(4-hydroxyphenyl)heptane, 2,2-bis(4-hydroxyphenyl)nonane, bis(3,5-dimethyl-4-hydroxyphenyl)methane, 2,2-bis(3-methyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-tert-butyl-4-hydroxyphenyl)propane, 2,2-bis(3-cyclohexyl-4- hydroxyphenyl)propane, 2,2-bis(3-allyl-4-hydroxyphenyl) propane, 2,2-bis(3-phenyl-4-hydroxyphenyl)propane, 2,2-bis(3,5-dimethyl-4-hydroxyphenyl)propane, 2,2-bis(3-chloro-4-hydroxyphenyl)propane, 2,2-bis(3,5-dichloro-4-hydroxyphenyl)propane, 2,2-bis(3-bromo-4-hydroxyphenyl)propane, 2,2-bis(3,5-dibromo-4-hydroxyphenyl)propane, 2,2-bis(4-hydroxyphenyl) hexafluoropropane, 1,1-bis(4-hydroxyphenyl)cyclopentane, 1,1-bis(4-hydroxyphenyl)cyclohexane, 1,1-bis(3-methyl-4-hydroxyphenyl)cyclohexane, 1,1-bis(3,5-dimethyl-4-hydroxyphenyl)cyclohexane, 1,1-bis(3,5-dichloro-4-hydroxyphenyl)cyclohexane, 1,1-bis(4-hydroxyphenyl)-3,3,5-trimethylcyclohexane, 1,1-bis(4-hydroxyphenyl) cycloheptane, 2,2-bis(4-hydroxyphenyl)norbornane, 2,2-bis (4-hydroxyphenyl)adamantane, 4,4'-dihydroxydiphenyl ether, 4,4'-dihydroxy-3,3'-dimethyldiphenyl ether, ethylene glycol bis(4-hydroxyphenyl)ether, 4,4'-dihydroxydiphenylsulfide, 3,3'-dimethyl-4,4'-dihydroxydiphenylsulfide, 3,3',5,5'-tetramethyl-4,4'-dihydroxydiphenylsulfide, 4,4'-dihydroxydiphenylsulfoxide, 3,3'-dimethyl-4,4'-dihydroxydiphenylsulfoxide, 4,4'-dihydroxydiphenylsulfone, 3,3'-dimethyl-4,4'-dihydroxydiphenylsulfone, 3,3'-diphenyl-4,4'-dihydroxydiphenylsulfone, 3,3'-dichloro-4,4'-dihydroxydiphenylsulfone, bis(4-hydroxyphenyl)ketone, bis(3-methyl-4-hydroxyphenyl)ketone, 3,3,3',3'-tetramethyl-6,6'-dihydroxyspiro(bis)indane, 3,3',4,4'-tetrahydro-4,4,4',4'-tetramethyl-2,2'-spirobi(2H-1-benzopyrane-7,7'-diol, trans-2,3-bis(4-hydroxyphenyl)-2-butene, 9,9-bis(4-hydroxyphenyl)fluorene, 9,9-bis(4-hydroxyphenyl)xanthene, 1,6-bis(4-hydroxyphenyl)-1,6-hexanedione, α,α,α', α'-tetramethyl-α,α'-bis(4-hydroxyphenyl)-p-xylene, α,α,α',α'-tetramethyl-α,α'-bis(4-hydroxyphenyl)-m-xylene, 2,6-dihydroxydibenzo-p-dioxine, 2,6-dihydroxythianthrene, 2,7-dihydroxyphenoxathine, 9,10-dimethyl-2,7-dihydroxyphenazine, 3,6-dihydroxydibenzofuran, 3,6-dihydroxydibenzothiophene, 4,4'-dihydroxybiphenyl, 1,4-dihydroxynaphthalene, 2,7-dihydroxypyrene, hydroquinone, and resorcin.

In the polycarbonate resin comprising the structural unit of formula (I) and the structural unit of formula (II) or (III), the molar ratio of a component composed of the structural unit of formula (II) or (III) with respect to the total amount of the polycarbonate resin may be freely determined, but preferably 5 mol % or more, more preferably 20 mol % or more because the total amount of the structural unit of formula (II) or (III) has an effect on the charge transporting properties of the obtained polycarbonate resin.

In the photoconductors according to the present invention, at least one of the previously mentioned aromatic polycarbonate resins is contained in the photoconductive layers 2, 2a, 2b, 2c, 2d, and 2e. The aromatic polycarbonate resin can be employed in different ways, for example, as shown in FIGS. 1 through 6.

In the photoconductor shown in FIG. 1, a photoconductive layer 2 is formed on an electroconductive support 1, which photoconductive layer 2 comprises an aromatic polycarbonate resin produced by the method of the present invention and a sensitizing dye, with the addition thereto of a binder agent (binder resin) when necessary. In this photoconductor, the aromatic polycarbonate resin works as a photoconductive material, through which charge carriers necessary for the light decay of the photoconductor are generated and transported. However, the aromatic polycarbonate resin itself scarcely absorbs light in the visible light range and, therefore, it is necessary to add a sensitizing dye which absorbs light in the visible light range in order to form latent electrostatic images by use of visible light.

Figure 2:
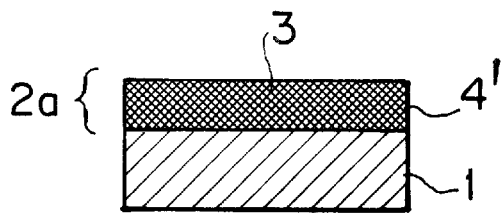
FIG. 2 is a schematic cross-sectional view of a second example of an electrophotographic photoconductor according to the present invention.

Referring to FIG. 2, there is shown an enlarged cross-sectional view of another embodiment of an electrophotographic photoconductor according to the present invention. In this photoconductor, there is formed a photoconductive layer 2a on an electroconductive support 1. The photoconductive layer 2a comprises a charge transport medium 4' comprising (i) an aromatic polycarbonate resin for use in the present invention, optionally in combination with a binder agent, and (ii) a charge generation material 3 dispersed in the charge transport medium 4'. In this embodiment, the aromatic polycarbonate resin (or a mixture of the aromatic polycarbonate resin and the binder agent) constitutes the charge transport medium 4'. The charge generation material 3, which is, for example, an inorganic material or an organic pigment, generates charge carriers. The charge transport medium 4' accepts the charge carriers generated by the charge generation material 3 and transports those charge carriers.

In this electrophotographic photoconductor of FIG. 2, it is basically necessary that the light-absorption wavelength regions of the charge generation material 3 and the aromatic polycarbonate resin not overlap in the visible light range. This is because, in order that the charge generation material 3 produce charge carriers efficiently, it is necessary that light pass through the charge transport medium 4' and reach the surface of the charge generation material 3. Since the aromatic polycarbonate resin produced by the method of the present invention do not substantially absorb light with a wavelength of 600 nm or more, it can work effectively as a charge transport material when used with the charge generation material 3 which absorbs the light in the visible region to the near infrared region and generates charge carriers. The charge transport medium 4' may further comprise a low-molecular weight charge transport material.

Figure 3:
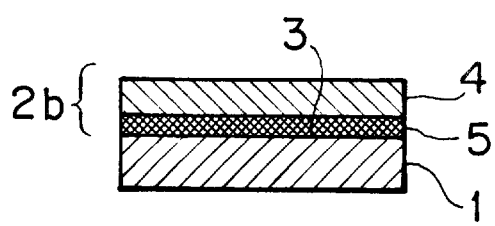
FIG. 3 is a schematic cross-sectional view of a third example of an electrophotographic photoconductor according to the present invention.

Referring to FIG. 3, there is shown an enlarged cross-sectional view of a further embodiment of an electrophotographic photoconductor according to the present invention. In the figure, there is formed on an electroconductive support 1 a two-layered photoconductive layer 2b comprising a charge generation layer 5 containing the charge generation material 3, and a charge transport layer 4 comprising an aromatic polycarbonate resin with the charge transporting properties for use in the present invention.

In this photoconductor, light which has passed through the charge transport layer 4 reaches the charge generation layer 5, and charge carriers are generated within the charge generation layer 5. The charge carriers which are necessary for the light decay for latent electrostatic image formation are generated by the charge generation material 3, and accepted and transported by the charge transport layer 4. The generation and transportation of the charge carriers are performed by the same mechanism as that in the photoconductor shown in FIG. 2.

In this case, the charge transport layer 4 comprises the aromatic polycarbonate resin, optionally in combination with a binder agent. Furthermore, in order to increase the efficiency of generating the charge carriers, the charge generation layer 5 may further comprise the aromatic polycarbonate resin for use in the present invention, and the photoconductive layer 2b including the charge generation layer 5 and the charge transport layer 4 may further comprise a low-molecular weight charge transport material. This can be applied to the embodiments of FIGS. 4 to 6 to be described later.

Figure 4:
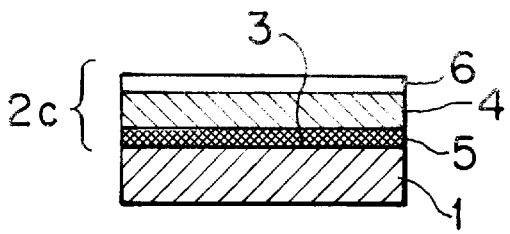
FIG. 4 is a schematic cross-sectional view of a fourth example of an electrophotographic photoconductor according to the present invention.

In the electrophotographic photoconductor of FIG. 3, a protective layer 6 may be provided on the charge transport layer 4 as shown in FIG. 4. The protective layer 6 may comprise the aromatic polycarbonate resin for use in the present invention, optionally in combination with a binder agent. In such a case, it is effective that the protective layer 6 be provided on a charge transport layer in which a low-molecular weight charge transport material is dispersed. The protective layer 6 may be provided on the photoconductive layer 2a of the photoconductor as shown in FIG. 2.

Figure 5:
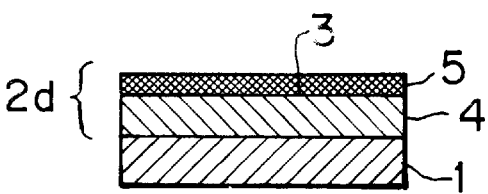
FIG. 5 is a schematic cross-sectional view of a fifth example of an electrophotographic photoconductor according to the present invention.

Referring to FIG. 5, there is shown still another embodiment of an electrophotographic photoconductor according to the present invention. In this figure, the overlaying order of the charge generation layer 5 and the charge transport layer 4 comprising the aromatic polycarbonate resin is reversed in view of the electrophotographic photoconductor as shown in FIG. 3. The mechanism of the generation and transportation of charge carriers is substantially the same as that of the photoconductor shown in FIG. 3.

Figure 6:
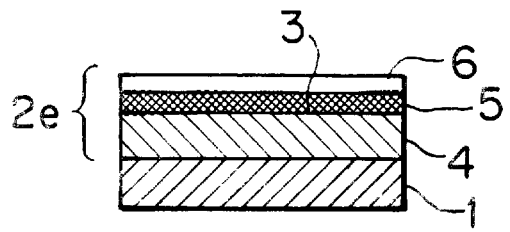
FIG. 6 is a schematic cross-sectional view of a sixth example of an electrophotographic photoconductor according to the present invention.

In the above photoconductor of FIG. 5, a protective layer 6 may be formed on the charge generation layer 5 as shown in FIG. 6 in light of the mechanical strength of the photoconductor.

When the electrophotographic photoconductor according to the present invention as shown in FIG. 1 is prepared, at least one aromatic polycarbonate resin for use in the present invention is dissolved in a solvent, with the addition thereto of a binder agent when necessary. To the thus prepared solution, a sensitizing dye is added, so that a coating liquid for the photoconductive layer 2 is prepared. The thus prepared photoconductive layer coating liquid is coated on an electroconductive support 1 and dried, so that a photoconductive layer 2 is formed on the electroconductive support 1.

It is preferable that the thickness of the photoconductive layer 2 be in the range of 3 to 50 μm, more preferably in the range of 5 to 40 μm. It is preferable that the amount of aromatic polycarbonate resin for use in the present invention be in the range of 30 to 100 wt. % of the total weight of the photoconductive layer 2. It is preferable that the amount of sensitizing dye for use in the photoconductive layer 2 be in the range of 0.1 to 5 wt. %, more preferably in the range of 0.5 to 3 wt. % of the total weight of the photoconductive layer 2.

Specific examples of the sensitizing dye for use in the present invention are triarylmethane dyes such as Brilliant Green, Victoria Blue B, Methyl Violet, Crystal Violet and Acid Violet 6B; xanthene dyes such as Rhodamine B, Rhodamine 6G, Rhodamine G Extra, Eosin S, Erythrosin, Rose Bengale and Fluoresceine; thiazine dyes such as Methylene Blue; and cyanine dyes such as cyanin.

The electrophotographic photoconductor shown in FIG. 2 can be obtained by the following method:

The finely-divided particles of the charge generation material 3 are dispersed in a solution in which at least one aromatic polycarbonate resin for use in the present invention, or a mixture of the aromatic polycarbonate resin and the binder agent is dissolved, so that a coating liquid for the photoconductive layer 2a is prepared. The coating liquid thus prepared is coated on the electroconductive support 1 and then dried, whereby the photoconductive layer 2a is provided on the electroconductive support 1.

It is preferable that the thickness of the photoconductive layer 2a be in the range of 3 to 50 μm, more preferably in the range of 5 to 40 μm. It is preferable that the amount of aromatic polycarbonate resin with the charge transporting properties be in the range of 40 to 100 wt. % of the total weight of the photoconductive layer 2a.

It is preferable that the amount of charge generation material 3 for use in the photoconductive layer 2a be in the range of 0.1 to 50 wt. %, more preferably in the range of 1 to 20 wt. % of the total weight of the photoconductive layer 2a.

Specific examples of the charge generation material 3 for use in the present invention are as follows: inorganic materials such as selenium, selenium-tellurium, cadmium sulfide, cadmium sulfide-selenium and α-silicon (amorphous silicon); and organic pigments, for example, azo pigments, such as C.I. Pigment Blue 25 (C.I. 21180), C.I. Pigment Red 41 (C.I. 21200), C.I. Acid Red 52 (C.I. 45100), C.I. Basic Red 3 (C.I. 45210), an azo pigment having a carbazole skeleton (Japanese Laid-Open Patent Application 53-95033), an azo pigment having a distyryl benzene skeleton (Japanese Laid-Open Patent Application 53-133445), an azo pigment having a triphenylamine skeleton (Japanese Laid-Open Patent Application 53-132347), an azo pigment having a dibenzothiophene skeleton (Japanese Laid-Open Patent Application 54-21728), an azo pigment having an oxadiazole skeleton (Japanese Laid-Open Patent Application 54-12742), an azo pigment having a fluorenone skeleton (Japanese Laid-Open Patent Application 54-22834), an azo pigment having a bisstilbene skeleton (Japanese Laid-Open Patent Application 54-17733), an azo pigment having a distyryl oxadiazole skeleton (Japanese Laid-Open Patent Application 54-2129), and an azo pigment having a distyryl carbazole skeleton (Japanese Laid-Open Patent Application 54-14967); phthalocyanine pigments such as C.I. Pigment Blue 16 (C.I. 74100); indigo pigments such as C.I. Vat Brown 5 (C.I. 73410) and C.I. Vat Dye (C.I. 73030); and perylene pigments such as Algol Scarlet B and Indanthrene Scarlet R (made by Bayer Co., Ltd.). These charge generation materials may be used alone or in combination.

When the above-mentioned charge generation material comprises a phthalocyanine pigment, the sensitivity and durability of the obtained photoconductor are remarkably improved. In such a case, there can be employed phthalocyanine pigments having a phthalocyanine skeleton as shown in the following formula (VI):

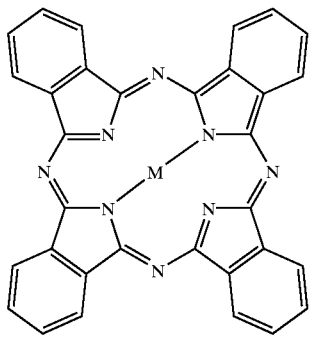

(VI)

In the above formula (VI), M (central atom) is a metal atom or hydrogen atom.

To be more specific, as the central atom (M) in the above formula, there can be employed an atom of H, Li, Be, Na, Mg, Al, Si, K, Ca, Sc, Ti, V, Cr, Mn, Fe, Co, Ni, Cu, Zn, Ga, Ge, Y, Zr, Nb, Mo, Tc, Ru, Rh, Pd, Ag, Cd, In, Sn, Sb, Ba, Hf, Ta, W, Re, Os, Ir, Pt, Au, Hg, Tl, La, Ce, Pr, Nd, Pm, Sm, Eu, Gd, Tb, Dy, Ho, Er, Tm, Yb, Lu, Th, Pa, U, Np or Am; the combination of atoms of an oxide chloride, fluoride, hydroxide or bromide. The central atom is not limited to the above-mentioned atoms.

The above-mentioned charge generation material with a phthalocyanine structure for use in the present invention may have at least the basic structure as shown in the above-mentioned formula (VI). Therefore, the charge generation material may have a dimer structure or trimer structure, and further, a polymeric structure. Further, the above-mentioned basic structure of the above formula (VI) may have a substituent.

Of the phthalocyanine compounds represented by formula (VI), an oxotitanium phthalocyanine compound which has the central atom (M) of TiO in the formula (VI) and a metal-free phthalocyanine compound which has a hydrogen atom as the central atom (M) are particularly preferred in the present invention because the obtained photoconductors show excellent photoconductive properties.

In addition, it is known that each of the aforementioned phthalocyanine compounds has a variety of crystal systems. For example, the above-mentioned oxotitanium phthalocyanine has crystal systems of α-type, β-type, γ-type, m-type, and y-type. In the case of copper phthalocyanine, there are crystal systems of α-type, β-type, and γ-type. The properties of the phthalocyanine compound vary depending on the crystal system thereof although the central metal atom is the same. According to the reference document of "Electrophotography—the Society Journal—Vol. 29, No. 4 (1990)", it is reported that the properties of the photoconductor vary depending on the crystal system of a phthalocyanine compound contained in the photoconductor. In light of the desired photoconductive properties, therefore, the phthalocyanine compounds may be each selected so as to have an optimal crystal system thereof. In the oxotitanium phthalocyanine, the y-type crystal system is particularly advantageous.

Two or more kinds of charge generation materials with phthalocyanine skeleton may be used in combination in the charge generation layer. Further, such charge generation materials with phthalocyanine skeleton may be used in combination with other charge generation materials.

The electrophotographic photoconductor shown in FIG. 3 can be obtained by the following method:

To provide the charge generation layer 5 on the electroconductive support 1, the charge generation material is vacuum-deposited on the electroconductive support 1. Alternatively, the finely-divided particles of the charge generation material 3 are dispersed in an appropriate solvent, together with the binder agent when necessary, so that a coating liquid for the charge generation layer 5 is prepared. The thus prepared coating liquid is coated on the electroconductive support 1 and dried, whereby the charge generation layer 5 is formed on the electroconductive support 1. The charge generation layer 5 may be subjected to surface treatment by buffing and adjustment of the thickness thereof if required. On the thus formed charge generation layer 5, a coating liquid in which at least one aromatic polycarbonate resin with the charge transporting properties for use in the present invention, optionally in combination with a binder agent is dissolved is coated and dried, so that the charge transport layer 4 is formed on the charge generation layer 5. In the charge generation layer 5, the same charge generation materials as employed in the above-mentioned photoconductive layer 2a can be used.

The thickness of the charge generation layer 5 is 5 $\mu$m or less, preferably 2 $\mu$m or less. It is preferable that the thickness of the charge transport layer 4 be in the range of 3 to 50 $\mu$m, more preferably in the range of 5 to 40 $\mu$m.

When the charge generation layer 5 is provided on the electroconductive support 1 by coating the dispersion in which finely-divided particles of the charge generation material 3 are dispersed in an appropriate solvent, it is preferable that the amount of finely-divided particles of the charge generation material 3 for use in the charge generation layer 5 be in the range of 10 to 100 wt. %, more preferably in the range of about 50 to 100 wt. % of the total weight of the charge generation layer 5. In the charge transport layer 4, it is preferable that the amount of aromatic polycarbonate resin for use in the present invention be in the range of 40 to 100 wt. % of the total weight of the charge transport layer 4.

The photoconductive layer 2b of the photoconductor shown in FIG. 3 may comprise a low-molecular-weight charge transport material as previously mentioned.

Examples of the low-molecular-weight charge transport material for use in the present invention are as follows: oxazole derivatives, oxadiazole derivatives (Japanese Laid-Open Patent Applications 52-139065 and 52- 139066), imidazole derivatives, triphenylamine derivatives (Japanese Laid-Open Patent Application 3- 285960), benzidine derivatives (Japanese Patent Publication 58-32372), α-phenylstilbene derivatives (Japanese Laid-Open Patent Application 57-73075), hydrazone derivatives (Japanese Laid-Open Patent Applications 55-154955, 55-156954, 55-52063, and 56- 81850), triphenylmethane derivatives (Japanese Patent Publication 51-10983), anthracene derivatives (Japanese Laid-Open Patent Application 51-94829), styryl derivatives (Japanese Laid-Open Patent Applications 56- 29245 and 58-198043), carbazole derivatives (Japanese Laid-Open Patent Application 58-58552), and pyrene derivatives (Japanese Laid-Open Patent Application 2- 94812).

To prepare the photoconductor shown in FIG. 4, a coating liquid for the protective layer 6 is prepared by dissolving the aromatic polycarbonate resin for use in the present invention, optionally in combination with the binder agent, in a solvent, and the thus obtained coating liquid is coated on the charge transport layer 4 of the photoconductor shown in FIG. 3, and dried.

It is preferable that the thickness of the protective layer 6 be in the range of 0.15 to 10 μm. In the protective layer 6, it is preferable that the amount of aromatic polycarbonate resin for use in the present invention be in the range of 40 to 100 wt. % of the total weight of the protective layer 6.

The electrophotographic photoconductor shown in FIG. 5 can be obtained by the following method:

The aromatic polycarbonate resin for use in the present invention, optionally in combination with the binder agent, is dissolved in a solvent to prepare a coating liquid for the charge transport layer 4. The thus prepared coating liquid is coated on the electroconductive support 1 and dried, whereby the charge transport layer 4 is provided on the electroconductive support 1. On the thus formed charge transport layer 4, a coating liquid prepared by dispersing the finely-divided particles of the charge generation material 3 in a solvent in which the binder agent may be dissolved when necessary, is coated, for example, by spray coating, and dried, so that the charge generation layer 5 is provided on the charge transport layer 4. The amount ratios of the components contained in the charge generation layer 5 and charge transport layer 4 are the same as those previously described in FIG. 3.

When the previously mentioned protective layer 6 is formed on the above prepared charge generation layer 5, the electrophotographic photoconductor shown in FIG. 6 can be fabricated.

To obtain any of the aforementioned photoconductors of the present invention, a metallic plate or foil made of aluminum, a plastic film on which a metal such as aluminum is deposited, and a sheet of paper which has been treated so as to be electroconductive can be employed as the electroconductive support 1.

Specific examples of the binder agent used in the preparation of the photoconductor according to the present invention are condensation resins such as polyamide, polyurethane, polyester, epoxy resin, polyketone and polycarbonate; and vinyl polymers such as polyvinylketone, polystyrene, poly-N-vinylcarbazole and polyacrylamide. All the resins that have electrically insulating properties and adhesion properties can be employed.

Some plasticizers may be added to the above-mentioned binder agents, when necessary. Examples of the plasticizers for use in the present invention are halogenated paraffin, dimethylnaphthalene and dibutyl phthalate. Further, a variety of additives such as an antioxidant, a light stabilizer, a thermal stabilizer and a lubricant may also be added to the binder agents when necessary.

Furthermore, in the electrophotographic photoconductor according to the present invention, an intermediate layer such as an adhesive layer or a barrier layer may be interposed between the electroconductive support and the photoconductive layer when necessary.

Examples of the material for use in the intermediate layer are polyamide, nitrocellulose, aluminum oxide and titanium oxide. It is preferable that the thickness of the intermediate layer be 1 μm or less.

When copying is performed by use of the photoconductor according to the present invention, the surface of the photoconductor is uniformly charged to a predetermined polarity in the dark. The uniformly charged photoconductor is exposed to a light image so that a latent electrostatic image is formed on the surface of the photoconductor. The thus formed latent electrostatic image is developed to a visible image by a developer, and the developed image can be transferred to a sheet of paper when necessary.

The photosensitivity and the durability of the electrophotographic photoconductor according to the present invention are remarkably improved.

Other features of this invention will become apparent in the course of the following description of exemplary embodiments, where are given for illustration of the invention and are not intended to be limiting thereof.

EXAMPLE 1-1

Synthesis of aromatic polycarbonate resin No. 1

2.69 g (5.56 mmol) of a diol with the charge transporting properties, that is, N-{4-[2,2-bis(4-hydroxyphenyl)vinyl]phenyl}-N,N-bis(4-tolyl)amine, 1.99 g (6.58 mmol) of ethylene glycol bis (4-hydroxybenzoate), 20 ml of dehydrated pyridine and 20 ml of dried dichloromethane were placed in a 200-ml four-necked flask equipped with a stirrer, a thermometer, a silica gel tube and a dropping funnel.

The above prepared reaction mixture was dissolved with stirring in a stream of nitrogen. Thereafter, with vigorously stirring the reaction mixture as maintaining the temperature of the reaction mixture at 20° C. on a water bath, a solution prepared by dissolving 1.44 g (4.85 mmol) of bis (trichloromethane)carbonate, that is a trimer of phosgene, in 10 ml of dried dichloromethane was dropwise added to the reaction mixture over a period of 20 minutes. After completion of the addition, the polymerization reaction was carried out for 1.5 hours at room temperature.

Thereafter, the reaction mixture was successively washed with a 5% aqueous solution of hydrochloric acid, and deionized water.

The thus obtained reaction solution was added dropwise to 1.5 l of methanol, whereby a yellow polycarbonate resin was precipitated. The thus precipitated polycarbonate resin was dried, thereby obtaining a polycarbonate resin No. 1 (in the form of a random copolymer) for use in the present invention.

The structure of the polycarbonate resin No. 1 is shown in TABLE 1. In TABLE 1, the composition ratio of each structural unit is put beside the structural unit, on the supposition that the total number of structural units is 1.

TABLE 1 also shows the results of the elemental analysis of the obtained polycarbonate resin. The polycarbonate resin was identified as a polycarbonate random copolymer comprising the above-mentioned structural units through the elemental analysis.

The glass transition temperature (Tg) of the above obtained aromatic polycarbonate resin No. 1 was 138.1° C. when measured by use of a differential scanning calorimeter.

The polystyrene-reduced number-average molecular weight (Mn) and weight-average molecular weight (Mw), which were measured by the gel permeation chromatography, were respectively 9,390 and 30,400.

Figure 7:
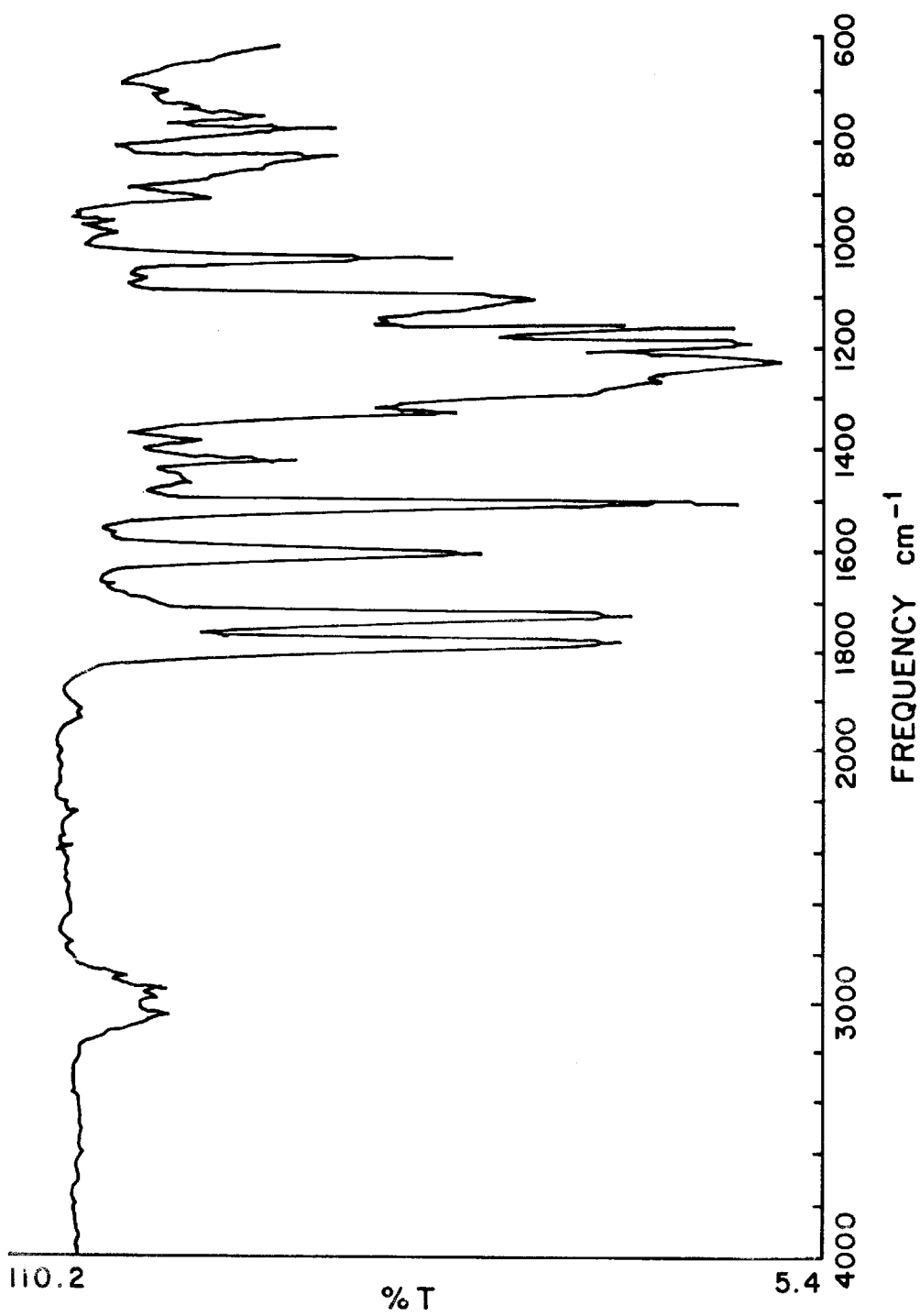
FIGS. 7 to 13 are IR spectra of aromatic polycarbonate resins Nos. 1 to 7 for use in the present invention (measured from a cast film of each resin on NaCl plate), respectively synthesized in Examples 1-1 to 1-7.

FIG. 7 shows an infrared spectrum of the aromatic polycarbonate resin No. 1, measured from a cast film of the polycarbonate resin on NaCl plate.

EXAMPLE 1-2

Synthesis of aromatic polycarbonate resin No. 2

3.23 g (6.67 mmol) of a diol with the charge transporting properties, that is, N-{4-[2,2-bis(4-hydroxyphenyl)vinyl]phenyl}-N,N-bis(4-tolyl) amine, 2.42 g (6.98 mmol) of diethylene glycol bis (4-hydroxybenzoate), 25 ml of dehydrated pyridine and 25 ml of dried dichloromethane were placed in a 200-ml four-necked flask equipped with a stirrer, a thermometer, a silica gel tube and a dropping funnel.

The above prepared reaction mixture was dissolved with stirring in a stream of nitrogen. Thereafter, with vigorously stirring the reaction mixture as maintaining the temperature of the reaction mixture at 20° C. on a water bath, a solution prepared by dissolving 1.62 g (5.46 mmol) of bis(trichloromethane)carbonate, that is a trimer of phosgene, in 10 ml of dried dichloromethane was dropwise added to the reaction mixture over a period of 20 minutes. After completion of the addition, the polymerization reaction was carried out for one hour at room temperature.

Thereafter, the reaction mixture was successively washed with a 5% aqueous solution of hydrochloric acid, and deionized water.

The thus obtained reaction solution was added dropwise to 1.5 l of methanol, whereby a yellow polycarbonate resin was precipitated.

The thus precipitated polycarbonate resin was dried, thereby obtaining a polycarbonate resin No. 2 (in the form of a random copolymer) for use in the present invention.

The structure of the polycarbonate resin No. 2 is shown in TABLE 1. In TABLE 1, the composition ratio of each structural unit is put beside the structural unit, on the supposition that the total number of structural units is 1.

TABLE 1 also shows the results of the elemental analysis of the obtained polycarbonate resin. The polycarbonate resin was identified as a polycarbonate random copolymer comprising the above-mentioned structural units through the elemental analysis.

The glass transition temperature (Tg) and the polystyrene-reduced number-average molecular weight (Mn) and weight-average molecular weight (Mw), measured by the same method as mentioned in Example 1—1, are also shown in TABLE 1.

Figure 8:
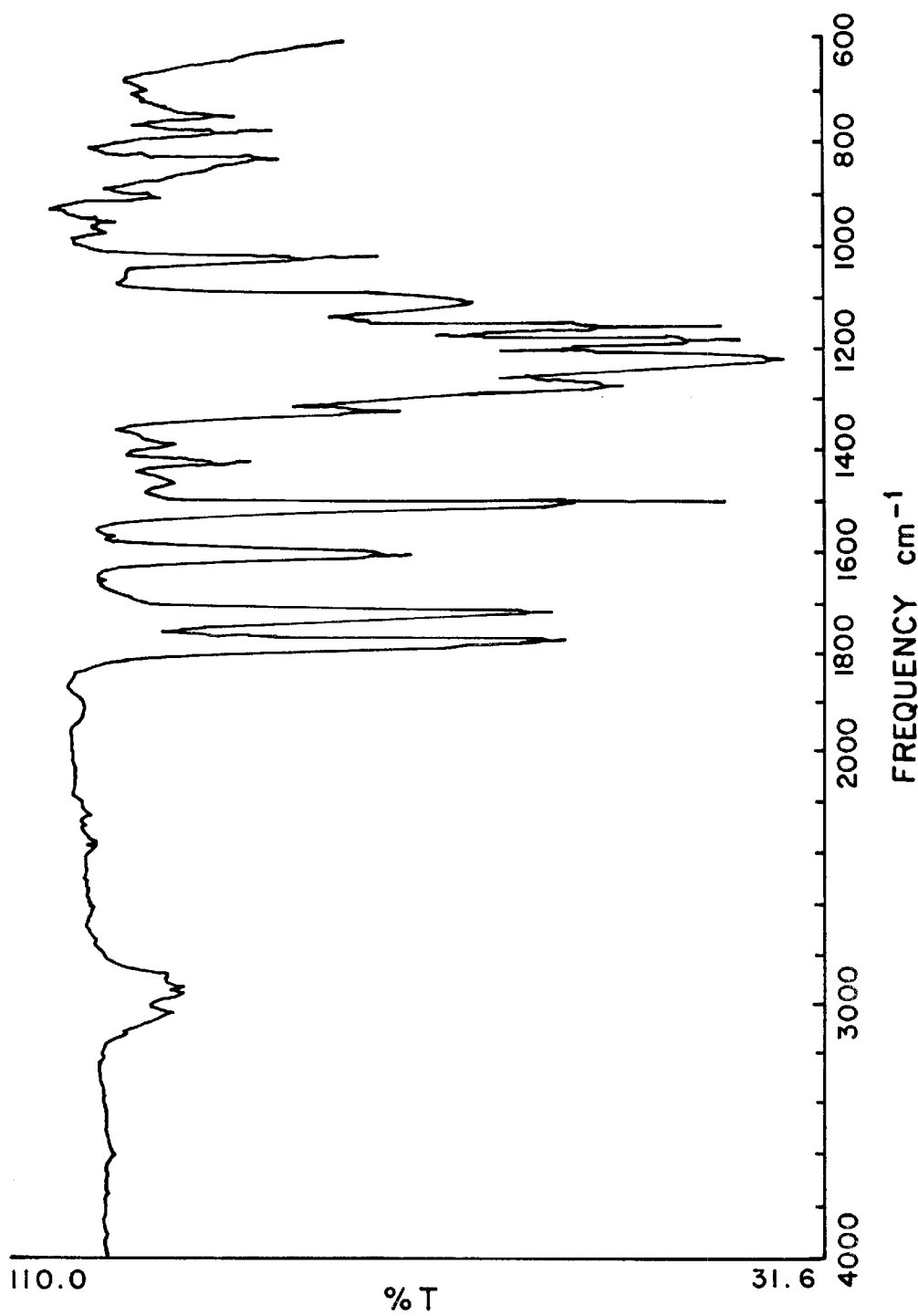

FIG. 8 shows an infrared spectrum of the aromatic polycarbonate resin No. 2, measured from a cast film of the polycarbonate resin on NaCl plate.

EXAMPLE 1-3

Synthesis of aromatic polycarbonate resin No. 3

2.69 g (5.56 mmol) of a diol with the charge transporting properties, that is, N-{4-[2,2-bis(4-hydroxyphenyl)vinyl]phenyl}-N,N-bis(4-tolyl)amine, 1.95 g (8.47 mmol) of 4-hydroxyphenyl-4-hydroxybenzoate, 20 ml of dehydrated pyridine and 20 ml of dried dichloromethane were placed in a 200-ml four-necked flask equipped with a stirrer, a thermometer, a silica gel tube and a dropping funnel.

The above prepared reaction mixture was dissolved with stirring in a stream of nitrogen. Thereafter, with vigorously stirring the reaction mixture as maintaining the temperature of the reaction mixture at 20° C. on a water bath, a solution prepared by dissolving 1.66 g (5.59 mmol) of bis(trichloromethane)carbonate, that is a trimer of phosgene, in 10 ml of dried dichloromethane was dropwise added to the reaction mixture over a period of 20 minutes. After completion of the addition, the polymerization reaction was carried out for one hour at room temperature.

Thereafter, the reaction mixture was successively washed with a 5% aqueous solution of hydrochloric acid, and deionized water.

The thus obtained reaction solution was added dropwise to 1.5 l of methanol, whereby a yellow polycarbonate resin was precipitated.

The thus precipitated polycarbonate resin was dried, thereby obtaining a polycarbonate resin No. 3 (in the form of a random copolymer) for use in the present invention.

The structure of the polycarbonate resin No. 3 is shown in TABLE 1. In TABLE 1, the composition ratio of each structural unit is put beside the structural unit, on the supposition that the total number of structural units is 1.

TABLE 1 also shows the results of the elemental analysis of the obtained polycarbonate resin. The polycarbonate resin was identified as a polycarbonate random copolymer comprising the above-mentioned structural units through the elemental analysis.

The glass transition temperature (Tg) and the polystyrene-reduced number-average molecular weight (Mn) and weight-average molecular weight (Mw), measured by the same method as mentioned in Example 1—1, are also shown in TABLE 1.

Figure 9:
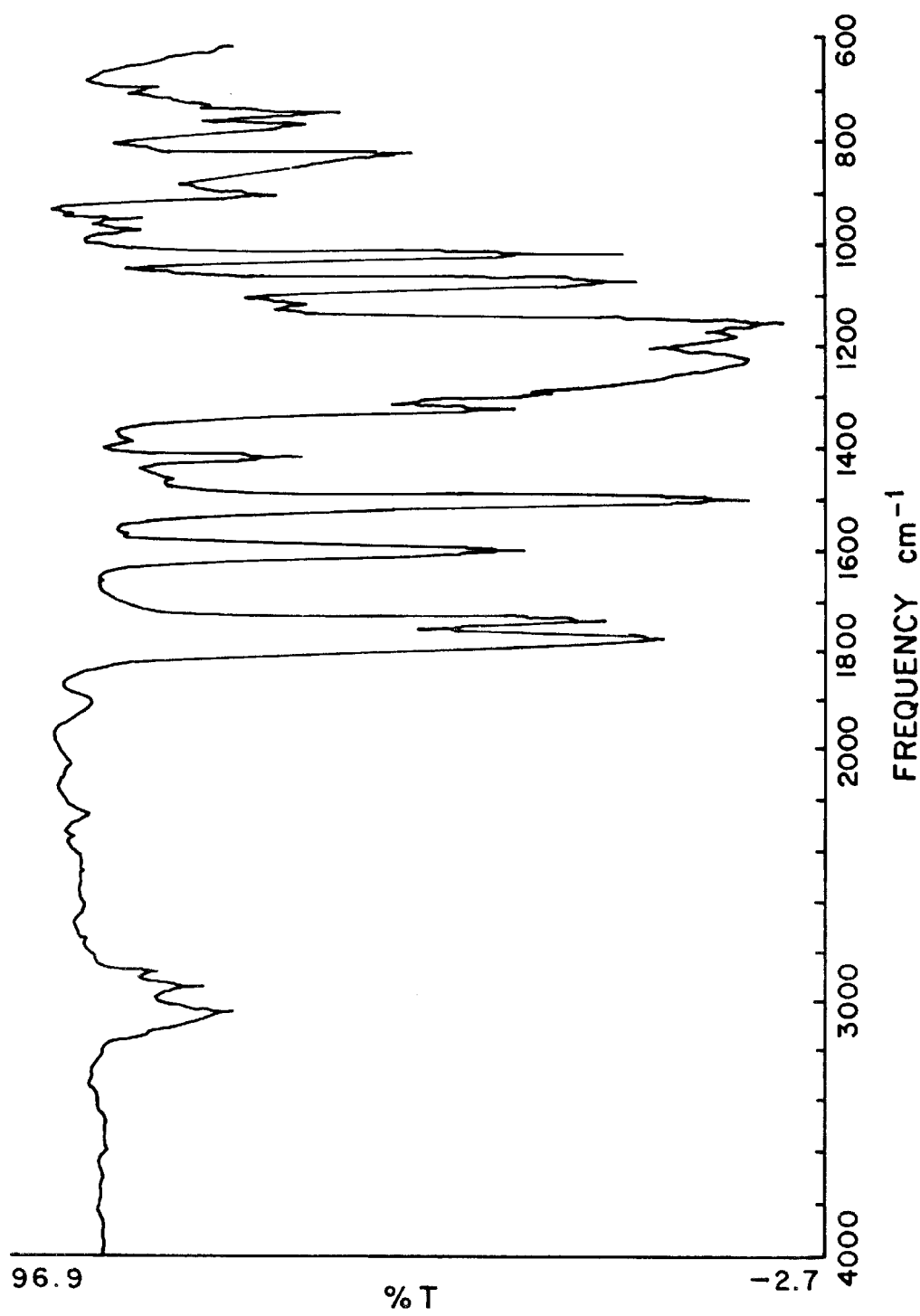

FIG. 9 shows an infrared spectrum of the aromatic polycarbonate resin No. 3, measured from a cast film of the polycarbonate resin on NaCl plate.

EXAMPLE 1-4

Synthesis of aromatic polycarbonate resin No. 4

3.22 g (6.6 mmol) of a diol with the charge transporting properties, that is 1,1-bis(4-hydroxyphenyl)-1-[4-(di-p-tolylaminophenyl)]ethane, 2.34 g (10.2 mmol) of 4-hydroxyphenyl-4-hydroxybenzoate, 18 ml of dehydrated pyridine and 25 ml of dried dichloromethane were placed in a 200-ml four-necked flask equipped with a stirrer, a thermometer, a silica gel tube and a dropping funnel.

The above prepared reaction mixture was dissolved with stirring in a stream of nitrogen. Thereafter, with vigorously stirring the reaction mixture as maintaining the temperature of the reaction mixture at 20° C. on a water bath, a solution prepared by dissolving 1.90 g (6.40 mmol) of bis(trichloromethane)carbonate, that is a trimer of phosgene, in 10 ml of dried dichloromethane was dropwise added to the reaction mixture over a period of 20 minutes. After completion of the addition, the polymerization reaction was carried out for one hour at room temperature.

Thereafter, the reaction mixture was successively washed with a 5% aqueous solution of hydrochloric acid, and deionized water.

The thus obtained reaction solution was added dropwise to 1.5 l of methanol, whereby a yellow polycarbonate resin was precipitated.

The thus precipitated polycarbonate resin was dried, thereby obtaining a polycarbonate resin No. 4 (in the form of a random copolymer) for use in the present invention.

The structure of the polycarbonate resin No. 4 is shown in TABLE 1. In TABLE 1, the composition ratio of each structural unit is put beside the structural unit, on the supposition that the total number of structural units is 1.

TABLE 1 also shows the results of the elemental analysis of the obtained polycarbonate resin. The polycarbonate resin was identified as a polycarbonate random copolymer comprising the above-mentioned structural units through the elemental analysis.

The glass transition temperature (Tg) and the polystyrene-reduced number-average molecular weight (Mn) and weight-average molecular weight (Mw), measured by the same method as mentioned in Example 1—1, are also shown in TABLE 1.

Figure 10:
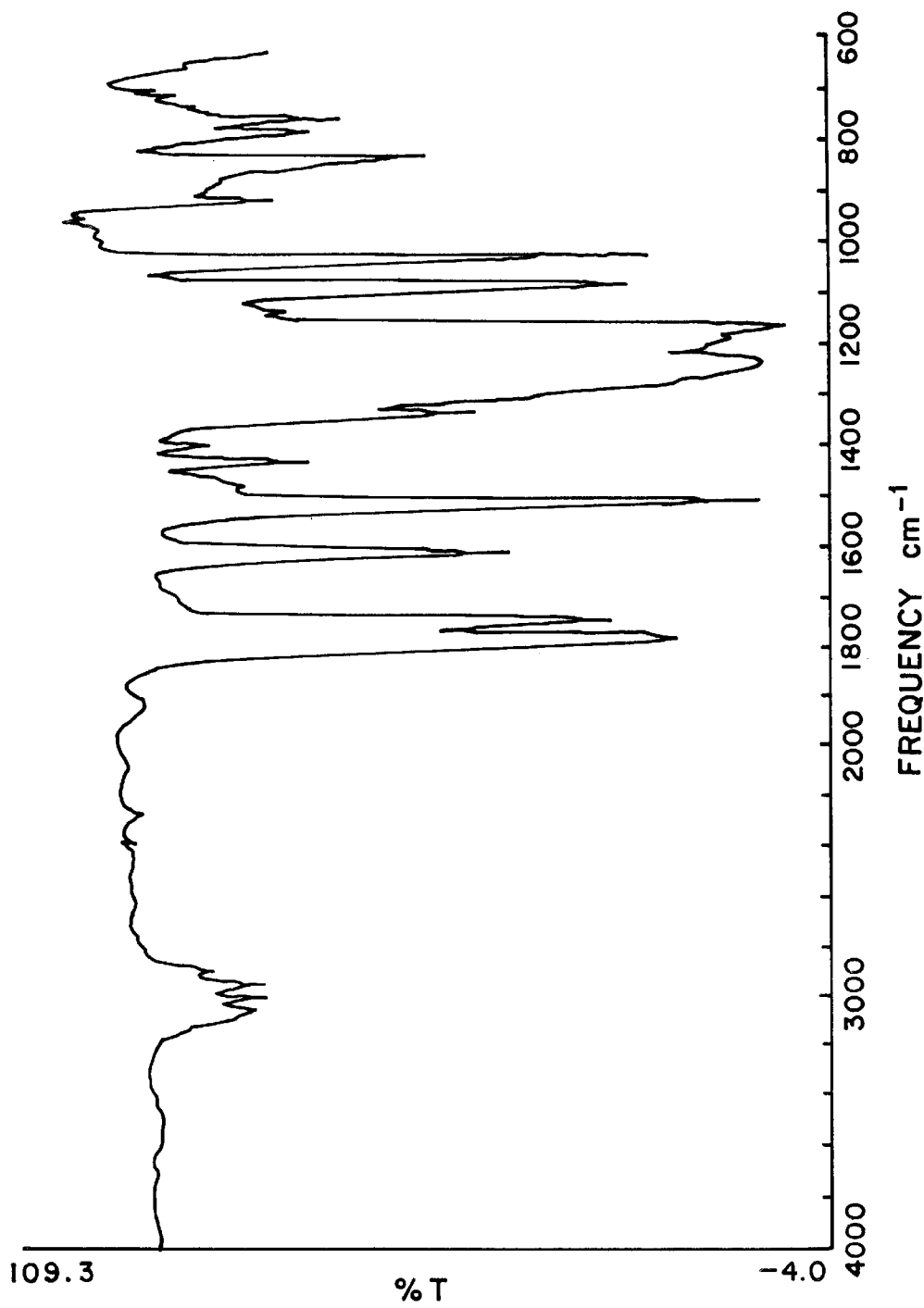

FIG. 10 shows an infrared spectrum of the aromatic polycarbonate resin No. 4, measured from a cast film of the polycarbonate resin on NaCl plate.

EXAMPLE 1-5

Synthesis of aromatic polycarbonate resin No. 5

2.69 g (5.56 mmol) of a diol with the charge transporting properties, that is, N-{4-[2,2-bis(4-hydroxyphenyl)vinyl) phenyl}-N,N-bis(4-tolyl)amine, 2.06 g (4.10 mmol) of 1,6-bis(4-hydroxybenzoyloxy)-1H,1H,6H, 6H-perfluorohexane, 25 ml of dehydrated pyridine and 15 ml of dried dichloromethane were placed in a 200-ml four-necked flask equipped with a stirrer, a thermometer, a silica gel tube and a dropping funnel.

The above prepared reaction mixture was dissolved with stirring in a stream of nitrogen. Thereafter, with vigorously stirring the reaction mixture as maintaining the temperature of the reaction mixture at 20° C. on a water bath, a solution prepared by dissolving 1.34 g (4.52 mmol) of bus (trichloromethane)carbonate, that is a trimer of phosgene, in 10 ml of dried dichloromethane was dropwise added to the reaction mixture over a period of 20 minutes. After completion of the addition, the polymerization reaction was carried out for one hour at room temperature.

Thereafter, the reaction mixture was successively washed with a 5% aqueous solution of hydrochloric acid, and deionized water.

The thus obtained reaction solution was added dropwise to 1.5 l of methanol, whereby a yellow polycarbonate resin was precipitated.

The thus precipitated polycarbonate resin was dried, thereby obtaining a polycarbonate resin No. 5 (in the form of a random copolymer) for use in the present invention.

The structure of the polycarbonate resin No. 5 is shown in TABLE 1. In TABLE 1, the composition ratio of each structural unit is put beside the structural unit, on the supposition that the total number of structural units is 1.

TABLE 1 also shows the results of the elemental analysis of the obtained polycarbonate resin. The polycarbonate resin was identified as a polycarbonate random copolymer comprising the above-mentioned structural units through the elemental analysis.

The glass transition temperature (Tg) and the polystyrene-reduced number-average molecular weight (Mn) and weight-average molecular weight (Mw), measured by the same method as mentioned in Example 1—1, are also shown in TABLE 1.

Figure 11:
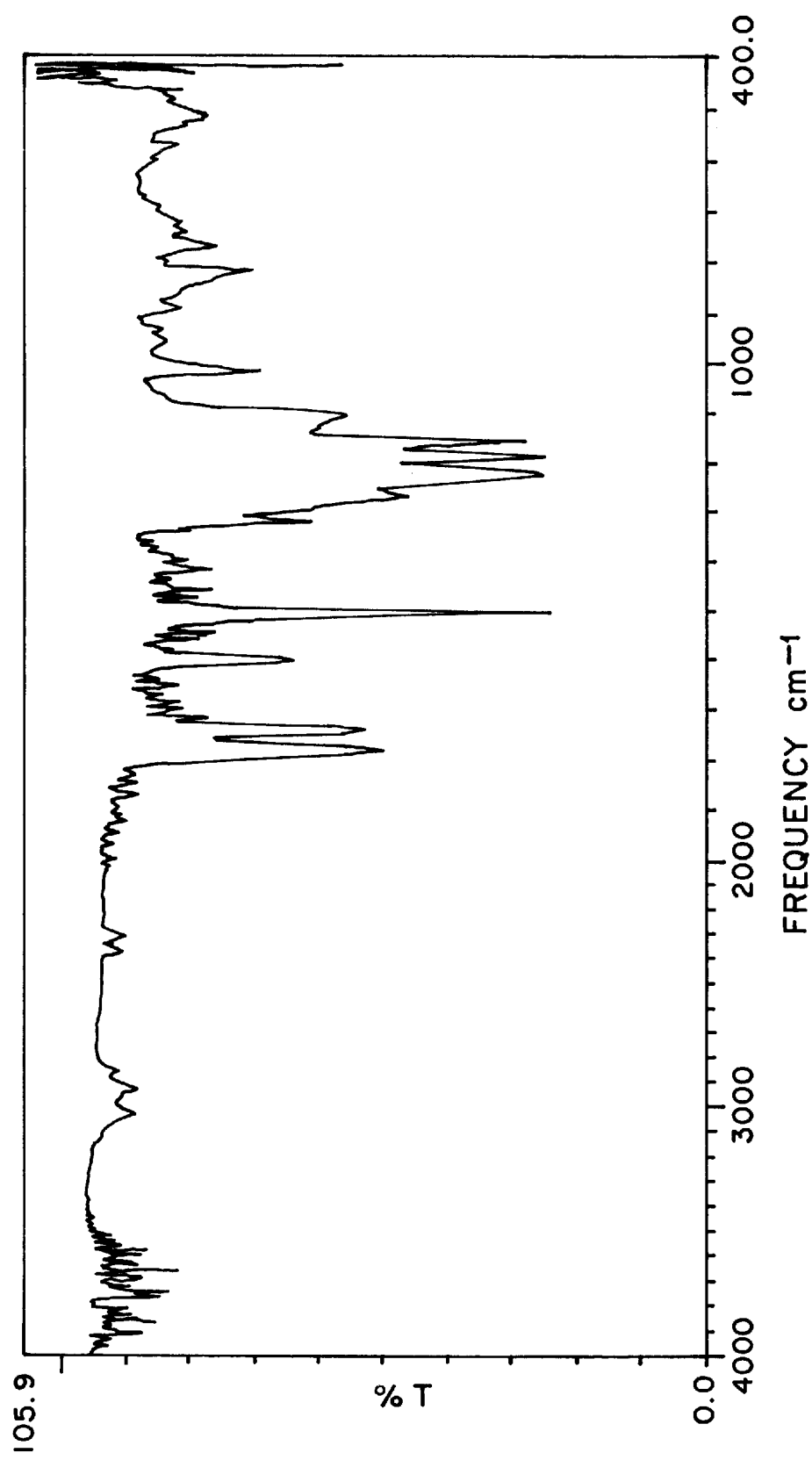

FIG. 11 shows an infrared spectrum of the aromatic polycarbonate resin No. 5, measured from a cast film of the polycarbonate resin on NaCl plate.

EXAMPLE 1-6

Synthesis of aromatic polycarbonate resin No. 6

3.23 g (6.67 mmol) of a diol with the charge transporting properties, that is, N-{4(2,2-bis(4-hydroxyphenyl)vinyl] phenyl}-N,N-bis(4-tolyl)amine, 2.44 g (6.07 mmol) of 1,4-bis(4-hydroxybenzoyloxy)-1H,1H,4H,4H- perfluorobutane, 30 ml of dehydrated pyridine and 20 ml of dried dichloromethane were placed in a 200-ml four-necked flash equipped with a stirrer, a thermometer, a silica gel tube and a dropping funnel.

The above prepared reaction mixture was dissolved with stirring in a stream of nitrogen. Thereafter, with vigorously stirring the reaction mixture as maintaining the temperature of the reaction mixture at 20° C. on a water bath, a solution prepared by dissolving 1.76 g (5.93 mmol) of bis (trichloromethane)carbonate, that is a trimer of phosgene, in 10 ml of dried dichloromethane was dropwise added to the reaction mixture over a period of 20 minutes. After completion of the addition, the polymerization reaction was carried out for one hour at room temperature.

Thereafter, the reaction mixture was successively washed with a 5% aqueous solution of hydrochloric acid, and deionized water.

The thus obtained reaction solution was added dropwise to 1.5 l of methanol, whereby a yellow polycarbonate resin was precipitated.

The thus precipitated polycarbonate resin was dried, thereby obtaining a polycarbonate resin No. 6 (in the form of a random copolymer) for use in the present invention.

The structure of the polycarbonate resin No. 6 is shown in TABLE 1. In TABLE 1, the composition ratio of each structural unit is put beside the structural unit, on the supposition that the total number of structural units is 1.

TABLE 1 also shows the results of the elemental analysis of the obtained polycarbonate resin. The polycarbonate resin was identified as a polycarbonate random copolymer comprising the above-mentioned structural units through the elemental analysis.

The glass transition temperature (Tg) and the polystryene-reduced number-average molecular weight (Mn) and weight-average molecular weight (Mw), measured by the same method as mentioned in Example 1—1, are also shown in TABLE 1.

Figure 12:
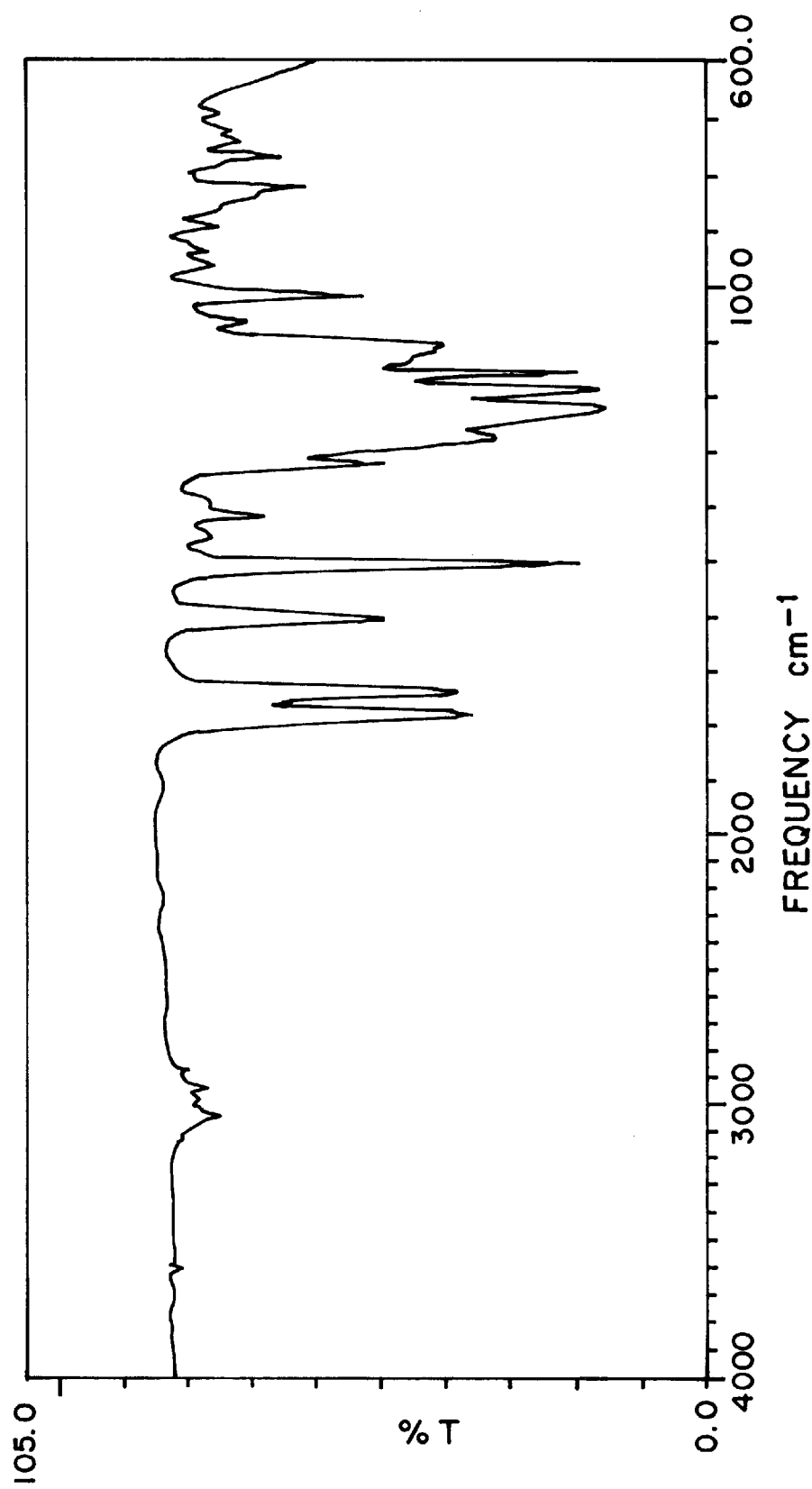

FIG. 12 shows an infrared spectrum of the aromatic polycarbonate resin No. 6, measured from a cast film of the polycarbonate resin on NaCl plate.

EXAMPLE 1-7

Synthesis of Aromatic Polycarbonate Resin No. 7

3.23 g (6.64 mmol) of a diol with the charge transporting properties, that is, 1,1-bis(4-hydroxyphenyl)-1-[4-(di-p-tolylaminophenyl)]ethane, 2.42 g (6.91 mmol) of p-phenylene-bis (4-hydroxybenzoate), 30 ml of dehydrated pyridine and 30 ml of dried dichloromethane were placed in a 200-ml four-necked flask equipped with a stirrer, a thermometer, a silica gel tube and a dropping funnel.

The above prepared reaction mixture was dissolved with stirring in a stream of nitrogen. Thereafter, with vigorously stirring the reaction mixture as maintaining the temperature of the reaction mixture at 20° C. on a water bath, a solution prepared by dissolving 1.61 g (5.43 mmol) of bis (trichloromethane)carbonate, that is a trimer of phosgene, in 10 ml of dried dichloromethane was dropwise added to the reaction mixture over a period of 20 minutes. After completion of the addition, the polymerization reaction was carried out for 2 hours at room temperature.

Thereafter, the reaction mixture was successively washed with a 5% aqueous solution of hydrochloric acid, and deionized water.

The thus obtained reaction solution was added dropwise to 1.5 l of methanol, whereby a white polycarbonate resin was precipitated.

The thus precipitated polycarbonate resin was dried, thereby obtaining a polycarbonate resin No. 7 (in the form of a random copolymer) for use in the present invention.

The structure of the polycarbonate resin No. 7 is shown in TABLE 1. In TABLE 1, the composition ratio of each structural unit is put beside the structural unit, on the supposition that the total number of structural units is 1.

TABLE 1 also shows the results of the elemental analysis of the obtained polycarbonate resin. The polycarbonate resin was identified as a polycarbonate random copolymer comprising the above-mentioned structural units through the elemental analysis.

The glass transition temperature (Tg), measured by the same method as mentioned in Example 1—1, is also shown in TABLE 1.

Figure 13:
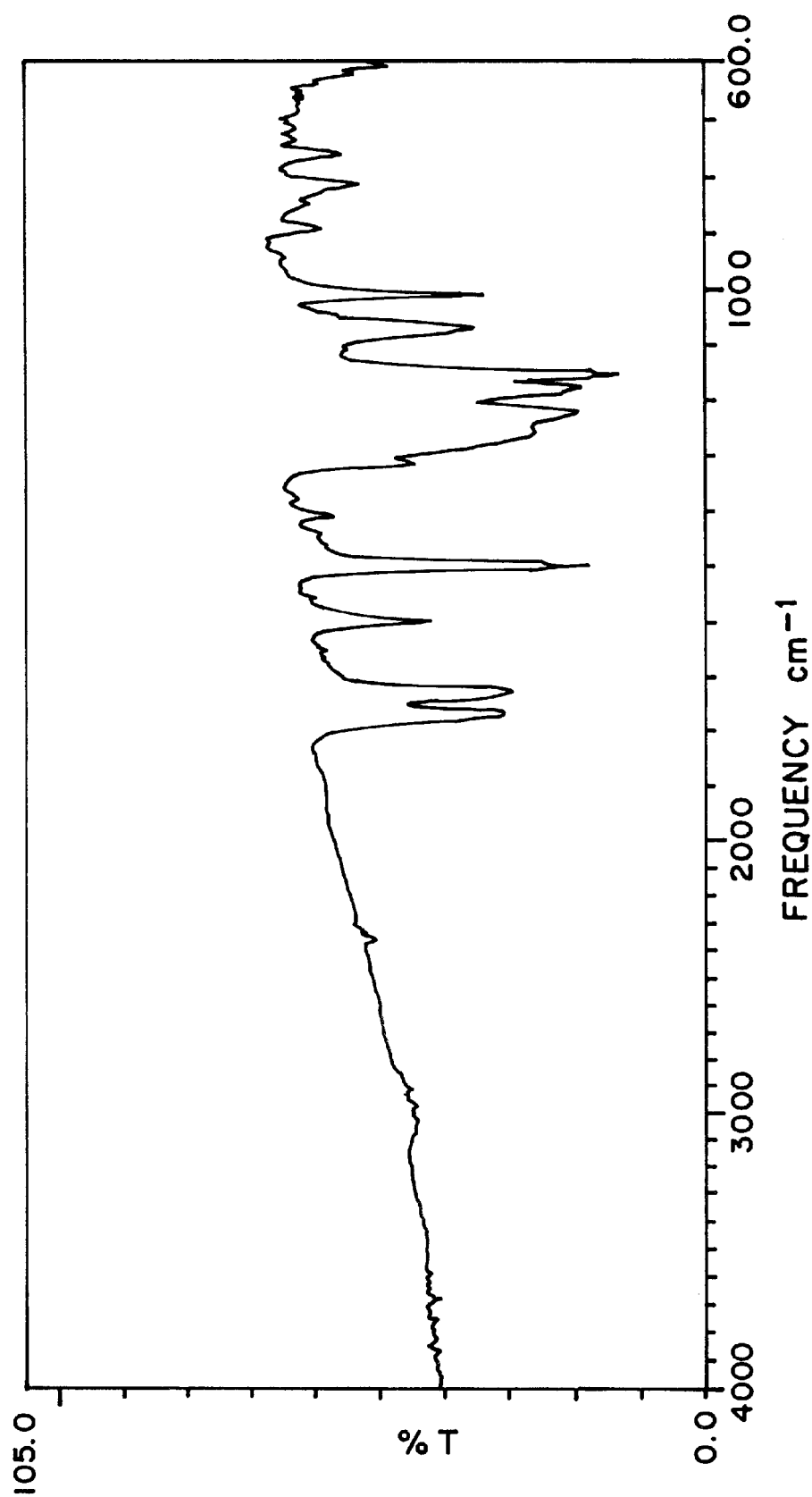

FIG. 13 shows an infrared spectrum of the aromatic polycarbonate resin No. 7, measured from a cast film of the polycarbonate resin on NaCl plate.

TABLE 1

| Example No. | Resin No. | Structure of Polycarbonate Resin | Molecular Weight Mn | Molecular Weight Mw | %C Found (Calcd.) | %H Found (Calcd.) | %N Found (Calcd.) | Tg (°C.) |
|---|---|---|---|---|---|---|---|---|
| 1-1 | 1 | (structure with $(-O-)$, $(-C(=O)-)_{0.46}$, $-COCH_2CH_2OC-$, $(-C(=O)-)_{0.54}$ units; triarylamine with two $CH_3$-substituted phenyl groups) | 9390 | 30400 | 73.48 (73.7) | 4.47 (4.62) | 1.44 (1.56) | 138.1 |
| 1-2 | 2 | (structure with $(-O-)$, $(-C(=O)-)_{0.49}$, $-COCH_2CH_2OCH_2CH_2OC-$, $(-C(=O)-)_{0.51}$ units; triarylamine with two $CH_3$-substituted phenyl groups) | 19200 | 101000 | 73.75 (73.31) | 4.85 (4.9) | 1.65 (1.56) | 121.6 |

TABLE 1-continued

| Example No. | Resin No. | Structure of Polycarbonate Resin | Molecular Weight Mn | Molecular Weight Mw | Elemental Analysis % C Found (Calcd.) | % H Found (Calcd.) | % N Found (Calcd.) | Tg (°C.) |
|---|---|---|---|---|---|---|---|---|
| 1-3 | 3 | (structure with diphenylmethylene triarylamine unit, ratios 0.37/0.63) | 36900 | 110000 | 74.63 (74.71) | 4.21 (4.33) | 1.55 (1.48) | 181.9 |
| 1-4 | 4 | (structure with methyl-substituted triarylamine unit, ratios 0.39/0.61) | 22100 | 54600 | 74.97 (75.19) | 4.32 (4.39) | 1.64 (1.56) | 180.1 |

TABLE 1-continued
| Example No. | Resin No. | Structure of Polycarbonate Resin | Molecular Weight Mn | Molecular Weight Mw | Elemental Analysis % C Found (Calcd.) | Elemental Analysis % H Found (Calcd.) | Elemental Analysis % N Found (Calcd.) | Tg (°C.) |
|---|---|---|---|---|---|---|---|---|
| 1-5 | 5 | 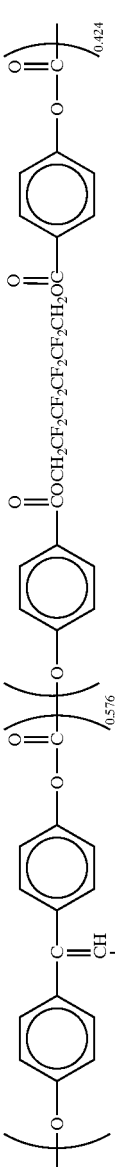 | 24900 | 110800 | 67.37 (67.44) | 3.84 (4.02) | 1.66 (1.56) | 135.1 |
| 1-6 | 6 | 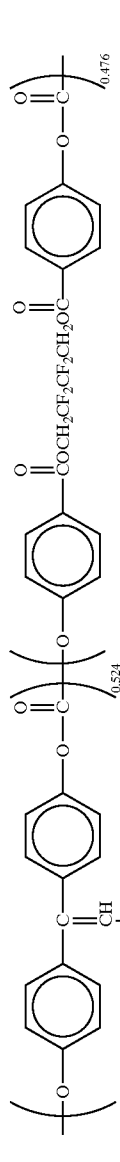 | 13000 | 59800 | 69.88 (69.84) | 4.04 (4.25) | 1.56 (1.56) | 139.1 |

TABLE 1-continued
| Example No. | Resin No. | Structure of Polycarbonate Resin | Molecular Weight Mn | Molecular Weight Mw | Elemental Analysis % C Found (Calcd.) | % H Found (Calcd.) | % N Found (Calcd.) | Tg (° C.) |
|---|---|---|---|---|---|---|---|---|
| 1-7 | 7 | 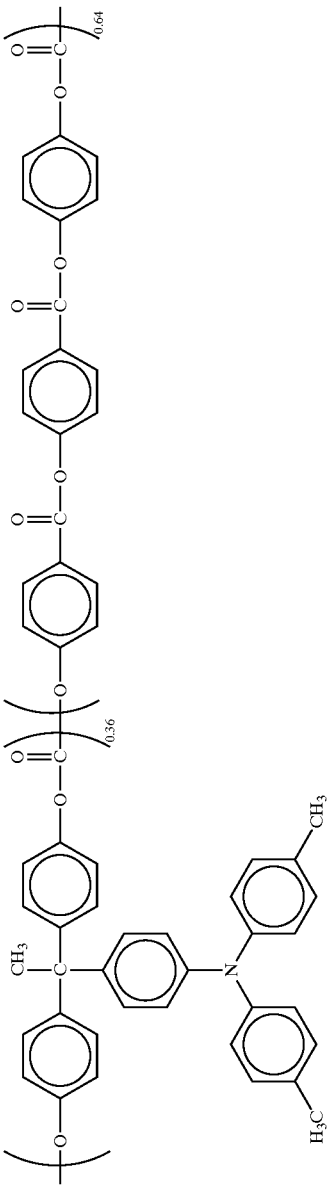 | insoluble in THF | insoluble in THF | 73.41 (73.54) | 4.30 (4.29) | 1.17 (1.18) | 227.6 |

Comparative Example 1-1

A comparative polycarbonate resin was produced by the interfacial polymerization method described in Japanese Laid-Open Patent Application 9-272735.

2.69 g (5.56 mmol) of a diphenol with the charge transporting properties, that is, N-(4-[2,2-bis(4-hydroxphenyl)vinyl]phenyl}-N,N-bis(4-tolyl)amine, 1.99 g (6.58 mmol) of a diol serving as a comonomer, that is, ethylene glycol bis(4-hydroxybenzoate), and 15 mg of a molecular weight modifier, that is, 4-tert-butyl phenol were placed in a reaction container with stirrer.

In a stream of nitrogen, an aqueous solution prepared by dissolving 2.62 g of sodium hydroxide and 66 mg of sodium hydrosulfite in 34.0 ml of water was added to the above prepared reaction mixture with stirring and dispersed therein.

Thereafter, the resultant mixture was cooled to 20° C. With the addition of a solution prepared by dissolving 1.44 g of bis(trichloromethyl)carbonate, that is a trimer of phosgene, in 28 ml of dichloromethane, the reaction mixture was vigorously stirred, and the resultant mixture was further stirred for 15 minutes, thereby forming a uniform emulsion. After that, with the addition of one drop of triethylamine serving as a catalyst, the emulsion was vigorously stirred at room temperature.

As a result, the reaction liquid did not thicken, and turned into a dark brown product. Thus, a desired polycarbonate resin was not obtained. It was proved by thin-layer chromatography that the above-mentioned ethylene glycol bis(4-hydroxybenzoate) serving as a comonomer undergoes hydrolysis under alkaline conditions.

EXAMPLE 2-1

Fabrication of Photoconductor No. 1

(Formation of Intermediate Layer)

A commercially available polyamide resin (Trademark "CM-8000", made by Toray Industries, Inc.) was dissolved in a mixed solvent of methanol and butanol, so that a coating liquid for an intermediate layer was prepared.

The thus prepared coating liquid was coated on an aluminum plate by a doctor blade, and dried at room temperature, so that an intermediate layer with a thickness of 0.3 μm was provided on the aluminum plate.
(Formation of Charge Generation Layer)

A coating liquid for a charge generation layer was prepared by pulverizing and dispersing a bisazo compound of the following formula, serving as a charge generation material, in a mixed solvent of cyclohexanone and 2-butanone using a ball mill. The thus obtained coating liquid was coated on the above prepared intermediate layer by a doctor blade, and dried at room temperature. Thus, a charge generation layer with a thickness of 0.5 μm was formed on the intermediate layer.

Bisazo Compound

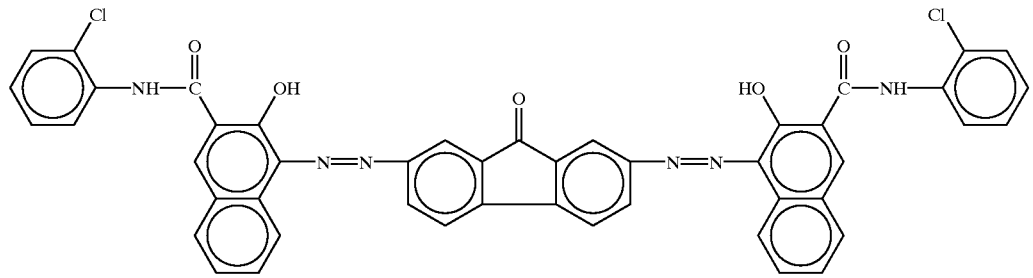

(Formation of Charge Transport Layer)

The aromatic polycarbonate resin No. 1 prepared in Example 1—1, serving as a charge transport material, was dissolved in dichloromethane. The thus obtained coating liquid was coated on the above prepared charge generation layer by a doctor blade, and dried at room temperature and then at 120° C. for 20 minutes, so that a charge transport layer with a thickness of 20 μm was provided on the charge generation layer.

Thus, an electrophotographic photoconductor No. 1 according to the present invention was fabricated.

EXAMPLES 2-2 to 2-6

The procedure for fabrication of the electrophotographic photoconductor No. 1 in Example 2-1 was repeated except that the aromatic polycarbonate resin No. 1 for use in the charge transport layer coating liquid in Example 2-1 was replaced by each of the aromatic polycarbonate resins Nos. 2 to 6 as illustrated in TABLE. 1.

Thus, electrophotographic photoconductors No. 2 to No. 6 according to the present invention were fabricated.

Each of the electrophotographic photoconductors No. 1 through No. 6 according to the present invention respectively fabricated in Examples 2-1 to 2-6 was charged negatively in the dark under application of −6 kV of corona charge for 20 seconds, using a commercially available electrostatic copying sheet testing apparatus ("Paper Analyzer Model SP-428" made by Kawaguchi Electro Works Co., Ltd.). The surface potential (Vm) of each photoconductor was measured.

Then, each electrophotographic photoconductor was allowed to stand in the dark for 20 seconds without applying any charge thereto, and the surface potential (Vo) of the photoconductor was measured.

Each photoconductor was then illuminated by a tungsten lamp in such a manner that the illuminance on the illuminated surface of the photoconductor was 5.3 lux, and the exposure $E_{1/2}$ (lux•sec) required to reduce the initial surface potential Vo (V) to ½ the initial surface potential Vo (V) was measured.

The results are shown in TABLE 2.

TABLE 2

| Example No. | Poly-carbonate Resin No. | Vm (V) | Vo (V) | $E_{1/2}$ (lux · sec) |
|---|---|---|---|---|
| 2-1 | No. 1 | −1375 | −1210 | 0.99 |
| 2-2 | No. 2 | −1351 | −1188 | 1.06 |
| 2-3 | No. 3 | −1078 | −881 | 1.41 |
| 2-4 | No. 4 | −1669 | −1506 | 2.94 |
| 2-5 | No. 5 | −1493 | −1346 | 0.93 |
| 2-6 | No. 6 | −1400 | −1267 | 1.05 |

Furthermore, each of the above obtained electrophotographic photoconductors No. 1 to No. 6 was set in a commercially available electrophotographic copying machine, and the photoconductor was charged and exposed to light images via the original images to form latent electrostatic images thereon. Then, the latent electrostatic images formed on the photoconductor were developed into visible toner images by a dry developer, and the visible toner images were transferred to a sheet of plain paper and fixed thereon. As a result, clear toner images were obtained on the paper. When a wet developer was employed for the image formation, clear images were formed on the paper similarly.

As previously explained, the polycarbonate resin prepared by the method of the present invention can effectively function as a photoconductive material in the electrophotographic photoconductors. Such polycarbonate resins for use in the present invention are optically or chemically sensitized with a sensitizer such as a dye or a Lewis acid, so that these resin compounds are preferably employed as charge transport materials in a photoconductive layer of the electrophotographic photoconductor, in particular, of a function-separating type electrophotographic photoconductor comprising a charge generation layer and a charge transport layer.

In addition, the above-mentioned aromatic polycarbonate resin is considered to be useful as an electroluminescence (EL) material.

The electrophotographic photoconductor according to the present invention comprises as an effective component the above-mentioned aromatic polycarbonate resin comprising a specific structural unit. The polycarbonate resin is provided with both excellent charge transporting properties and high mechanical strength, so that the obtained electrophotographic photoconductor can exhibit improved sensitivity and durability.

What is claimed is:

1. A method of producing an aromatic polycarbonate resin comprising, solution polymerizing a diphenol compound having a triarylamine structure with a diol compound of formula (I):

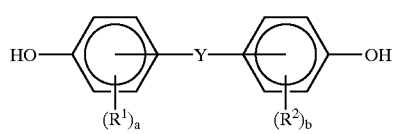

(I)

wherein $R^1$ and $R^2$ are each independently unsubstituted or substituted alkyl, unsubstituted or substituted aryl, or halogen; a and b are each independently an integer of 0 to 4; and Y is —COO— or

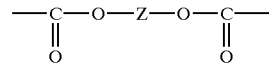

in which Z is an unsubstituted or substituted bivalent aliphatic group or unsubstituted or substituted arylene group.

2. The method as claimed in claim 1, wherein said diphenol compound is represented by formula (II):

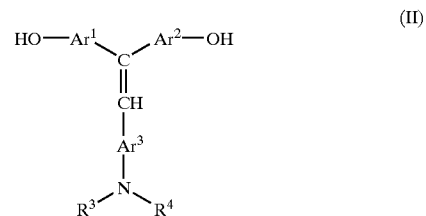

(II)

wherein $Ar^1$, $Ar^2$, and $Ar^3$ are each unsubstituted or substituted arylene; and $R^3$ and $R^4$, which may be the same or different, are each aryl, unsubstituted or substituted alkyl, or unsubstituted or substituted aryl.

3. The method as claimed in claim 1, wherein said diphenol compound is represented by formula (III):

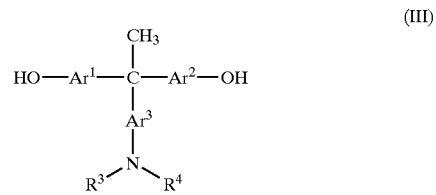

(III)

wherein $Ar^1$, $Ar^2$, and $Ar^3$ are each unsubstituted or substituted arylene; and $R^3$ and $R^4$, which may be the same or different, are each unsubstituted or substituted acyl, unsubstituted or substituted alkyl, or unsubstituted or substituted aryl.

4. The method as claimed in claim 2, wherein said diol compound of formula (I) and said diphenol compound of formula (II) produce an aromatic polycarbonate resin represented by formula (IV):

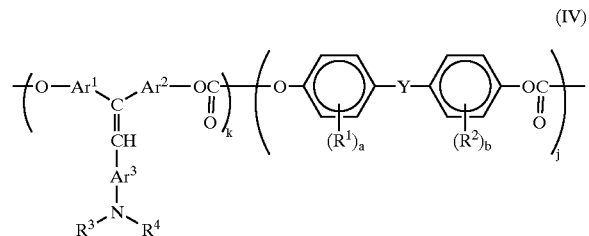

(IV)

wherein $Ar^1$, $Ar^2$, and $Ar^3$ are each unsubstituted or substituted arylene; $R^1$ and $R^2$ are each independently unsubstituted or substituted alkyl, unsubstituted or substituted aryl, or halogen; $R^3$ and $R^4$, which may be the same or different, are each acyl group, unsubstituted or substituted alkyl, or unsubstituted or substituted aryl; a and b are each independently an integer of 0 to 4; k is an integer of 5 to 5000 and j is an integer of 5 to 5000, provided that $0<k/(k+j)\leq 1$; and Y is —COO— or

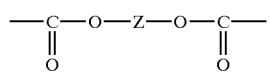

in which Z is an unsubstituted or substituted bivalent aliphatic group or unsubstituted or substituted arylene.

5. The method as claimed in claim 3, wherein said diol compound of formula (I) and said diphenol compound of formula (III) produce an aromatic polycarbonate resin represented by formula (V):

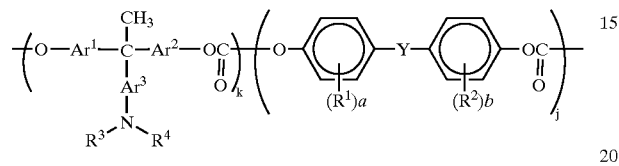

wherein $Ar^1$, $Ar^2$, and $Ar^3$ are each unsubstituted or substituted arylene; $R^1$ and $R^2$ are each independently unsubstituted or substituted alkyl, unsubstituted or substituted aryl, or halogen; $R^3$ and $R^4$, which may be the same or different, are each an acyl group, unsubstituted or substituted alkyl, or unsubstituted or substituted aryl; a and b are each independently an integer of 0 to 4; k is an integer of 5 to 5000 and j is an integer of 5 to 5000, provided that $0 < k/(k+j) \leq 1$; and Y is —COO— or

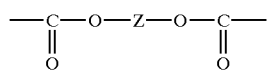

in which Z is an unsubstituted or substituted bivalent aliphatic group or unsubstituted or substituted arylene.

6. A method of producing an aromatic polycarbonate resin comprising, solution polymerizing a diphenol compound having a triarylamine structure with a diol compound of formula (I):

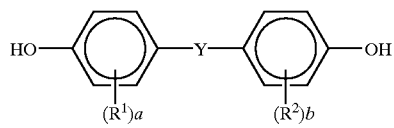

wherein $R^1$ and $R^2$ are each independently alkyl or alkyl substituted by F, CN, phenyl or phenyl substituted by halogen or straight or branched chain alkyl having 1–5C, aryl or aryl substituted by the above-mentioned substituted or unsubstituted alkyl, alkoxy substituted by the above-mentioned substituted or substituted alkyl, halogen or amino represented by the following formula:

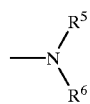

in which $R^5$ and $R^6$ are each the above-mentioned substituted or unsubstituted alkyl or the above-mentioned substituted or unsubstituted aryl, and $R^5$ and $R^6$ may form a ring together or in combination with a carbon atom of the aryl to constitute piperidino, morpholino or julolidyl; a and b are each independently an integer of 0 to 4; and Y is —COO— or

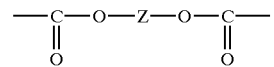

wherein Z is a bivalent aliphatic group or a bivalent aliphatic group substituted by the substituents for the above-mentioned alkyl or arylene or arylene substituted by the substituents for the above-mentioned aryl.

7. The method as claimed in claim 6, wherein said diphenol compound is represented by formula (II):

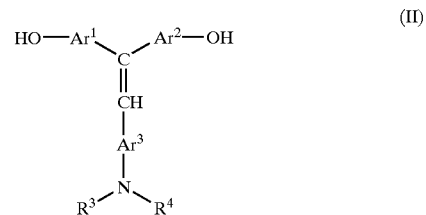

wherein $R^3$ and $R^4$, which may be the same or different, are each acyl, alkyl or alkyl substituted by F, CN, phenyl or phenyl substituted by halogen or straight or branched chain alkyl having 1–5C, or aryl or aryl substituted by the above-mentioned substituted or unsubstituted alkyl, alkoxy substituted by the above-mentioned substituted or unsubstituted alkyl, halogen or amino represented by the following formula:

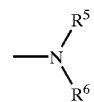

in which $R^5$ and $R^6$ are each the above-mentioned substituted or unsubstituted alkyl or the above-mentioned substituted or unsubstituted aryl, and $R^5$ and $R^6$ may form a ring together or in combination with a carbon atom of the aryl to constitute piperidino, morpholino or julolidyl;

and wherein $Ar^1$, $Ar^2$, and $Ar^3$ are each arylene or arylene substituted by the substituents for the above-mentioned aryl.

8. The method as claimed in claim 6, wherein said diphenol compound is represented by formula (III):

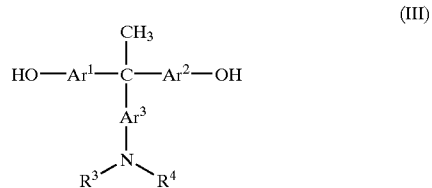

wherein $R^3$ and $R^4$, which may be the same or different, are each acyl, alkyl or alkyl substituted by F, CN, phenyl or phenyl substituted by halogen or straight or branched chain alkyl having 1–5C, or aryl or aryl substituted by the above-mentioned substituted or unsubstituted alkyl, alkoxy substituted by the above-mentioned substituted or unsubstituted alkyl, halogen or amino represented by the following formula:

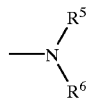

in which $R^5$ and $R^6$ are each of the above-mentioned substituted or unsubstituted alkyl or the above-mentioned substituted or unsubstituted aryl, and $R^5$ and $R^6$ may form a ring together or in combination with a carbon atom of the aryl to constitute piperidino, morpholino or julolidyl, and wherein $Ar^1$, $Ar^2$, and $Ar^3$ are each arylene or arylene substituted by the substituents for the above-mentioned aryl.

9. The method as claimed in claim 7, wherein said diol compound of formula (I) and said diphenol compound of formula (II) produce an aromatic polycarbonate resin represented by formula (IV):

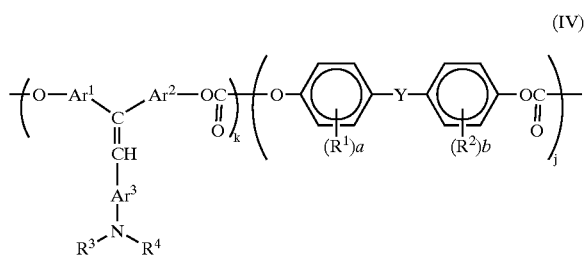

(IV)

wherein $R^1$ and $R^2$ are each independently alkyl or alkyl substituted by F, CN, phenyl or phenyl substituted by halogen or straight or branched chain alkyl having 1–5C, aryl or aryl substituted by the above-mentioned substituted or unsubstituted alkyl, alkoxy substituted by the above-mentioned substituted or unsubstituted alkyl, halogen or amino represented by the following formula:

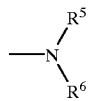

in which $R^5$ and $R^6$ are each the above-mentioned substituted or unsubstituted alkyl or the above-mentioned substituted or unsubstituted aryl, and $R^5$ and $R^6$ may form a ring together or in combination with a carbon atom of the aryl to constitute piperidino, morpholino or julolidyl; and $R^3$ and $R^4$, which may be the same or different, are each acyl, alkyl, or alkyl substituted as above, or aryl or aryl substituted as above; a and b are each independently an integer of 0 to 4; k is an integer of 5 to 5000 and j is an integer of 5 to 5000, provided that $0<k/(k+j)\leq 1$; and Y is —COO— or

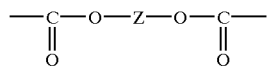

wherein Z is a bivalent aliphatic group or a bivalent aliphatic group substituted by the substituents for the above-mentioned alkyl or arylene or arylene substituted by the substituents for the above-mentioned aryl, and wherein $Ar^1$, $Ar^2$, and $Ar^3$ are each arylene or arylene substituted by the substituents for the above-mentioned aryl.

10. The method as claimed in claim 8, wherein said diol compound of formula (I) and said diphenol compound of formula (III) produce an aromatic polycarbonate resin represented by formula (V):

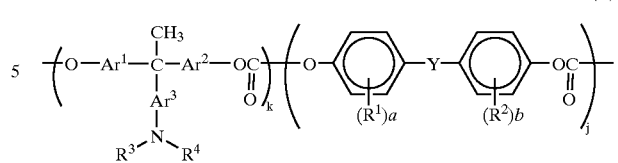

(V)

the above-mentioned substituted or unsubstituted alkyl, halogen or amino represented by the following formula:

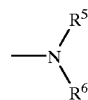

in which $R^5$ and $R^6$ are each the above-mentioned substituted or unsubstituted alkyl or the above-mentioned substituted or unsubstituted aryl, and $R^5$ and $R^6$ may form a ring together or in combination with a carbon atom of the aryl to constitute piperidino, morpholino or julolidyl; and $R^3$ and $R^4$, which may be the same or different, are each acyl, alkyl, or alkyl substituted as above, or aryl or aryl substituted as above; a and b are each independently an integer of 0 to 4; k is an integer of 5 to 5000 and j is an integer of 5 to 5000, provided that $0<k/(k+j)\leq 1$; and Y is —COO— or

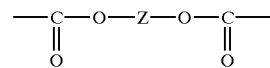

wherein Z is a bivalent aliphatic group or a bivalent aliphatic group substituted by the substituents for the above-mentioned alkyl or arylene or arylene substituted by the substituents for the above-mentioned aryl, and wherein $Ar^1$, $Ar^2$, and $Ar^3$ are each arylene or arylene substituted by the substituents for the above-mentioned aryl.

11. The method as claimed in claim 6, wherein said solution polymerizing is carried out in a reaction solvent using a tertiary amine deacidifying agent.

12. The method as claimed in claim 6, wherein said tertiary amine is selected from the group consisting of trimethylamine, triethylamine, tripropylamine and pyridine.

13. The method as claimed in claim 6, wherein said pyridine is dehydrated pyridine in an amount of 5 to 100 vol. % of the total volume of said reaction solvent.

14. The method as claimed in claim 6, wherein said diol compound of formula (I) is 4-hydroxyphenyl-4-hydroxybenzoate, ethylene glycol-bis(4-hydroxybenzoate), diethylene glycol-bis(4-hydroxybenzoate), triethylene glycol-bis(4-hydroxybenzoate), 1,3-bis(4-hydroxyphenyl) tetramethyl-disiloxane, or phenol-modified silicone oil.

15. The method as claimed in claim 1, wherein said solution polymerizing is carried out in a reaction solvent using a tertiary amine deacidifying agent.

16. The method as claimed in claim 1, wherein said tertiary amine is selected from the group consisting of trimethylamine, triethylamine, tripropylamine and pyridine.

17. The method as claimed in claim 1, wherein said pyridine is dehydrated pyridine in an amount of 5 to 100 vol. % of the total volume of said reaction solvent.

18. The method as claimed in claim 1, wherein said diol compound of formula (I) is 4-hydroxyphenyl-4-hydroxybenzoate, ethylene glycol-bis(4-hydroxybenzoate), diethylene glycol-bis(4-hydroxybenzoate), triethylene glycol-bis(4-hydroxybenzoate), 1,3-bis(4-hydroxyphenol) tetramethyl-disiloxane, or phenol-modified silicone oil.

* * * * *

UNITED STATES PATENT AND TRADEMARK OFFICE
CERTIFICATE OF CORRECTION

PATENT NO.    : 6,486,293 B1
DATED         : November 26, 2002
INVENTOR(S)   : Kohkoku RI et al.

It is certified that error appears in the above-identified patent and that said Letters Patent is hereby corrected as shown below:

Title page,
Item [57], ABSTRACT,
Line 2, after formula (I), "alkyl croup" should read -- alkyl group --.

Column 1,
Line 29, "gorge" should read -- charge --;
Line 46, "raving" should read -- having --;
Lines 50-51, "9,801,517" should read -- 4,801,517 --;
Line 51, "4,959,298" should read -- 4,959,288 --;
Line 52, "5,080,909" should read -- 5,080,989 --;
Line 54, "9-175337" should read -- 4-175337 --.

Column 2,
Line 37, "dial" should read -- diol --;
Line 57, "an," should read -- an --;
Line 60, "or" should read -- of --.

Column 3,
Line 11, "9-22135" should read -- 9-272735 --;
Line 16, "polymerizaton" should read -- polymerization --.

Column 4,
Line 62, "aryl" should read -- acyl --.

Column 5,
Line 32, "or" should read -- an --;
Line 46, "$R^2R^3$" should read -- $R^2$, $R^3$ --;
Line 47, "these" should read -- those --.

Column 6,
Line 12, "Koqyo" should read -- Kogyo --;
Lines 42-43, "temperature the amount" should read -- temperature, the amount --.

Column 7,
Line 35, "dimethylacaproic" should read -- dimethylcaproic --;
Line 50, "nave" should read -- have --.

Column 9,
Line 41, "diphenylcylohexane" should read -- diphenylcyclohexane --.

UNITED STATES PATENT AND TRADEMARK OFFICE
CERTIFICATE OF CORRECTION

PATENT NO. : 6,486,293 B1
DATED : November 26, 2002
INVENTOR(S) : Kohkoku RI et al.

It is certified that error appears in the above-identified patent and that said Letters Patent is hereby corrected as shown below:

Column 10,
Line 54, "demethylpropane" should read -- dimethylpropane --.

Column 15,
Line 25, "an oxide" should read -- an oxide, --.

Column 16,
Line 22, "dissolved is" should read -- dissolved, is --;
Line 59, "56- 81850)" should read -- 56-81850 --.

Column 18,
Line 19, "where" should read -- which --.

Column 21,
Lines 51-52, "bus(trichloromethane)carbonate," should read
-- bis-(trichloromethane)carbonate, --.

Column 22,
Line 28, "flash" should read -- flask --.

Column 36,
Line 25, "aryl," should read -- acyl, --.

Column 42,
Line 1, "1,3-bis-(4-hydroxyphenol)" should read -- 1,3-bis(4-hydroxyphenyl) --.

Signed and Sealed this

Thirtieth Day of September, 2003

JAMES E. ROGAN
*Director of the United States Patent and Trademark Office*